United States Patent
Sarkis et al.

(10) Patent No.: US 10,472,526 B2
(45) Date of Patent: Nov. 12, 2019

(54) PEELABLE SURFACE COATING SYSTEM OVER MULTI-SECTION SUBSTRATE

(71) Applicant: Diversey, Inc., Charlotte, NC (US)

(72) Inventors: Michael T. Sarkis, Racine, WI (US); Anthony Merten, Mt. Pleasant, WI (US); Andrew Movrich, Milwaukee, WI (US)

(73) Assignee: DIVERSEY, INC., Charlotte, NC (US)

( * ) Notice: Subject to any disclaimer, the term of this patent is extended or adjusted under 35 U.S.C. 154(b) by 208 days.

(21) Appl. No.: 15/518,565

(22) PCT Filed: Oct. 13, 2015

(86) PCT No.: PCT/US2015/055264
§ 371 (c)(1),
(2) Date: Apr. 12, 2017

(87) PCT Pub. No.: WO2016/061058
PCT Pub. Date: Apr. 21, 2016

(65) Prior Publication Data
US 2017/0275476 A1 Sep. 28, 2017

Related U.S. Application Data

(60) Provisional application No. 62/063,048, filed on Oct. 13, 2014.

(51) Int. Cl.
*C09D 5/20* (2006.01)
*B32B 7/02* (2019.01)
(Continued)

(52) U.S. Cl.
CPC .............. *C09D 5/20* (2013.01); *B32B 7/02* (2013.01); *B32B 7/04* (2013.01); *B32B 7/06* (2013.01);
(Continued)

(58) Field of Classification Search
CPC ....... B32B 15/08; B32B 33/00; B32B 43/006; B32B 7/02; B32B 7/04; B32B 7/06;
(Continued)

(56) References Cited

U.S. PATENT DOCUMENTS

| | | | |
|---|---|---|---|
| 5,804,541 A * | 9/1998 | Jans | C09D 9/04 510/214 |
| 7,897,002 B2 * | 3/2011 | Bober | B32B 7/06 156/237 |

(Continued)

FOREIGN PATENT DOCUMENTS

| | | | |
|---|---|---|---|
| JP | 2006139259 A | 6/2006 | |
| JP | 2013083139 A | 5/2013 | |

(Continued)

OTHER PUBLICATIONS

EP15797721.6 Extended European Search Report dated Jan. 29, 2018 (5 pages).

(Continued)

*Primary Examiner* — Travis M Figg
(74) *Attorney, Agent, or Firm* — Michael Best & Friedrich LLP

(57) ABSTRACT

A peelable surface coating system comprises a multilayer peelable surface coating adhered to multi-section substrate with joints between sections. The multilayer peelable surface coating has strength and flexibility layers and a wear layer. Each strength and flexibility layer has a thickness of <0.6 mil and a Konig hardness of <40 seconds. The wear layer has a Konig value of >60 seconds and a thickness of from 0.2 to 3 mils. The strength and flexibility layers have a combined total thickness of 3.3 to 6 mils. The peelable coating system spans joints between sections and is peelable from both the substrate and the joints, and has an elongation (E %) of >350%, a break force maximum load (BF gm-Force) of >3000 gm-Force, a total thickness (T mils) of from (Continued)

3.5 to 10 mils, and wherein: (E %)×(BF gm-Force)×(T mils)>$4\times10^6$.

28 Claims, 3 Drawing Sheets

(51) Int. Cl.
    *B32B 7/04*     (2019.01)
    *B32B 7/06*     (2019.01)
    *B32B 15/08*     (2006.01)
    *B32B 33/00*     (2006.01)
    *B32B 43/00*     (2006.01)

(52) U.S. Cl.
    CPC .............. *B32B 15/08* (2013.01); *B32B 33/00* (2013.01); *B32B 43/006* (2013.01); *B32B 2307/554* (2013.01); *B32B 2309/105* (2013.01); *B32B 2471/00* (2013.01)

(58) Field of Classification Search
    CPC ........ B32B 2307/554; B32B 2309/105; B32B 2471/00; C09D 5/20
    See application file for complete search history.

(56) References Cited

U.S. PATENT DOCUMENTS

| | | | |
|---|---|---|---|
| 2005/0118379 A1 | 6/2005 | Anderson et al. | |
| 2006/0078717 A1* | 4/2006 | Yamaya | C08G 77/50 428/212 |
| 2009/0130454 A1* | 5/2009 | Ogino | C09D 5/20 428/423.1 |
| 2010/0062200 A1* | 3/2010 | Domes | B05D 7/14 428/35.8 |
| 2010/0330372 A1* | 12/2010 | Ludtke | B32B 7/06 428/413 |
| 2012/0252958 A1* | 10/2012 | Yagi | C08G 18/0823 524/507 |
| 2012/0276297 A1 | 11/2012 | Cypcar et al. | |
| 2012/0276381 A1* | 11/2012 | Cypcar | B32B 43/006 428/355 N |
| 2014/0087156 A1* | 3/2014 | Sarkis | C09D 5/02 428/212 |

FOREIGN PATENT DOCUMENTS

| | | | | |
|---|---|---|---|---|
| WO | 2005103171 | 11/2005 | | |
| WO | 2012055793 | 5/2012 | | |
| WO | WO-2012055793 A1 * | 5/2012 | ........... | C09D 5/1693 |
| WO | WO-2012162641 A2 * | 11/2012 | ............... | C09D 5/02 |

OTHER PUBLICATIONS

Chinese Patent Office Action for Application No. 201580067990.3 dated Jan. 7, 2019 (14 pages, English translation included).
Australian Patent Office Examination Report for Application No. 2015333795 dated May 2, 2019 (3 pages).
Japanese Patent Office Action for Application No. 2017-520980 dated Jul. 30, 2019 (4 pages, English translation included).

* cited by examiner

PEELABLE SURFACE COATING SYSTEM OVER MULTI-SECTION SUBSTRATE

Surface coating systems protect and enhance the appearance of substrates, such as floors, counter tops, and other areas subjected to traffic or other heavy use. Substrates are prone to wear and deterioration with traffic, such as pedestrian and vehicular traffic.

Sealers can be applied to porous substrates and absorb into the substrate and solidify within the substrate in order to reduce the permeability of the substrate and thereby enhance the durability and appearance of the substrate. Coatings are applied to porous and nonporous substrates to protect against abrasion, scratching, staining, chemical damage, and other adverse effects. Coatings can also be designed to significantly enhance the appearance of the substrate by improving cleanliness, smoothness, reflection, and gloss. Polymer-based floor coatings, in the form of aqueous emulsion or solvent solution, are typically applied to floors with mops or other applicators, and allowed to dry to a hard protective film.

Polymer based floor coatings are generally maintained with the use of cleaners and tools, which can include various buffing and burnishing machines. Although floor maintenance programs can be effective, they are expensive. Moreover, as the surface becomes worn or otherwise acquires an unsatisfactory appearance over time, it becomes necessary to entirely remove the coating. Stripping can be carried out with chemical strippers and/or mechanical abrasion. Stripping is time-consuming, labor-intensive, potentially hazardous, and can damage the substrate itself, particularly after multiple stripping cycles.

Traditional floor finishes, including coatings such as acrylic polymer and/or polyurethane, have been applied to floors. Recent trends in protective floor coatings are to move away from traditional finishes and move toward durable coatings such as highly cross-linked coatings, such as those including uv-cured polymers such as uv-cured polyurethane, uv-cured acrylic polymer, crosslinked polyurethane, crosslinked polyurea, crosslinked acrylic polymer, crosslinked epoxy polymer, and polysiloxane. Although these coatings can provide enhanced durability relative to traditional floor finishes, they too eventually have to be removed from the floor due to scratching, scuffs, stains, etc. The highly cross-linked structure of these coatings makes them difficult, if not impossible, to remove by any means other than physical abrasion.

For some time there has been an ongoing search for a peelable floor surface coating system. It would be desirable that such a system would be applied in a traditional manner, and be removable by mechanical peeling. Peeling could be either manual or via machine, in either case without the need for any substantial amount of chemical stripping and/or mechanical abrasion. Of course, such a peelable coating must be adhered to the substrate well enough that it does not prematurely separate from the substrate.

The establishment and maintenance of floor coatings in commercial buildings subject to public traffic pose additional challenges. It is undesirable to close part or all of the building during normal operating hours for floor coating stripping, floor coating installation, and/or floor coating maintenance. Moreover, the installation of a floor coating system overnight, i.e., during closed hours, must be done in a manner such that when the building opens up for public traffic the next day, the freshly installed floor coating system is safe and durable.

SUMMARY

It has been discovered that the requirements to generate peelability of a relatively thin coating system, such as a coating system having a post-peel thickness of from 3.5 to 10 mils, are substantially different for multi-sectional substrates versus substrates which are continuous, i.e., non-sectional. More particularly, it has been unexpectedly discovered that disclosed examples of so-called "peelable" coating systems such as are described in the prior art (e.g. WO2012/162,641 A2 and EP 1,921,118 A1), disclosed as being peelable from vinyl composition tile, are in fact peelable from a single tile, but in fact are not peelable from a substrate made from a plurality of vinyl composition tiles. Furthermore, research with real-world multi-sectional flooring has revealed the unexpected discovery that the factor dominating this difference in peelability is the ability to peel across the joints between the sections with the peeled coating remaining intact, i.e., without the peelable coating tearing off in a manner that prematurely terminates the peeling process.

Research seeking a solution to peelability of a thin coating from a multi-sectional substrate has taken various paths. At one point it was believed that providing a coating system having a high tensile strength would provide the thin coating with peelability. This did not prove to be the case. Rather, it has been discovered that a coating having a post-peel thickness of from 3.5 to 10 mils in combination with a high percent elongation, and a high force to break, can be peeled off the multi-sectional substrate, including across the joints between substrate sections.

A first aspect is directed to a peelable surface coating system comprising: (A) a multi-section substrate with joints between sections, and (B) a multilayer peelable surface coating. The multilayer peelable surface coating comprises (1) a plurality of strength and flexibility layers and (2) a wear layer. The peelable surface coating system spans the joints between the sections and is peelable from both the substrate and the joints between the substrate sections. The strength and flexibility layers are between the wear layer and the substrate. The peelable surface coating has a post-peel average percent elongation (E) of at least 350%, a post-peel average break force maximum load (BF) of at least 3000 gm-Force, and a post-peel average total thickness (T) of from 3.5 to 10 mils. The peelable coating has a combination of elongation, break force maximum load and post-peel average thickness in accordance with the equation: (E %)×(BF gm-Force)×(T mils)≥4×10$^6$. The plurality of strength and flexibility layers comprises at least one member selected from the group consisting of polyurethane, polybutadiene, polyisoprene, ethylene/propylene/diene terpolymer, polysiloxane, polyester, polyamide, polyurea, and polyether. Each of the strength and flexibility layers exhibits an average Konig hardness value of less than 40 seconds. Each of the strength and flexibility layers has an average thickness of less than 0.6 mil. The plurality of strength and flexibility layers has an average combined total post-peel thickness of from 3.3 mils to 6 mils. The wear layer comprises at least one member selected from the group consisting of polyurethane, acrylic polymer, polysiloxane, polysilazane, polyester, polyamide, polyurea, and epoxy polymer. The wear layer exhibits an average Konig hardness value of at least 60 seconds. The wear layer has a post-peel average thickness of from 0.2 mil to 3 mils.

In an embodiment, the plurality of strength and flexibility layers comprises at least one member selected from the group consisting of polyurethane, polybutadiene, polyisoprene, polysiloxane, and polyurea, with each of the strength and flexibility layers exhibiting an average Konig hardness value of from 1 to 40 seconds, and each of the strength and flexibility layers having an average thickness of less than 0.54 mil. The plurality of strength and flexibility layers has an average combined total post-peel thickness of from 3.5 to 5.5 mils. The at least one wear layer comprises at least one member selected from the group consisting of polyurethane, acrylic polymer, polysiloxane, polysilazane, polyurea, and epoxy polymer. The wear layer exhibits an average Konig hardness value of at least 70 seconds, and the wear layer has an post-peel average thickness of from 0.2 mil to 2.5 mils. The peelable surface coating has a post-peel average percent elongation (E) of at least 380%, a post-peel average break force maximum load (BF) of at least 3200 gm-Force, and an post-peel average total thickness (T) of from 3.7 to 9 mils, and wherein: (E %)×(BF gm-Force)×(T mils)≥4.5×10$^6$.

In an embodiment, the plurality of strength and flexibility layers comprises at least one member selected from the group consisting of polyurethane made from polyester diol, polyurethane made from polycarbonate diol, polyurethane made from polyether diol, polyurethane made from polybutadiene diol, polyurethane made from polyacrylate diol, polyurethane/acrylic hybrid polymer, polybutadiene homopolymer, polyisoprene homopolymer, styrene/butadiene random copolymer, acrylonitrile/butadiene/styrene terpolymer, styrene/butadiene block copolymer, styrene/isoprene block copolymer, silicone rubber, and organically modified silicate polymer, and each of the strength and flexibility layers exhibits an average Konig hardness value of from 3 to 35 seconds, and each of the strength and flexibility layers has an average thickness of less than 0.48 mil. The plurality of strength and flexibility layers has an average combined total post-peel thickness of from 3.8 to 5 mils. The wear layer comprises at least one member selected from the group consisting of polyurethane made from polyester diol, polyurethane made from polycarbonate diol, polyurethane made from polyacrylate diol, acrylic polymer, polysilazane, uv-curable polyurethane, uv-curable polyester, uv-curable acrylic polymer, and uv-curable epoxy polymer, uv-curable polysilazane, uv-curable polysiloxane, uv-curable polyurea, polyurea made from multi-functional isocyanate and multi-functional amine, polyurethane/acrylic hybrid, polysiloxane made from multi-functional alkoxy silane, epoxy polymer made from multi-functional epoxide and multi-functional amine, and organically modified silicate polymer, and the wear layer exhibits an average Konig hardness value of at least 80 seconds, and the wear layer having an post-peel average thickness of from 0.3 mil to 2 mils. The peelable surface coating has a post-peel average percent elongation (E) of at least 390%, a post-peel average break force maximum load (BF) of at least 3400 gm-Force, and an post-peel average total thickness (T) of from 4.1 to 8 mils, and wherein (E %)×(BF gm-Force)×(T mils)≥4.75×10$^6$.

In an embodiment, the wear layer comprises a uv-curable polymer and the wear layer is cured by exposure to uv-radiation In an embodiment, the plurality of strength and flexibility layers comprises at least one member selected from the group consisting of polyurethane made from polyester diol, polyurethane made from polycarbonate diol, polyurethane made from polyether diol, polyurethane/polyalkyl methacrylate hybrid, styrene/butadiene random copolymer, hydrogenated styrene/butadiene block copolymer, hydrogenated styrene/isoprene block copolymer, room temperature vulcanization silicone (RTV silicone rubber), copolymer made from multi-functional alkoxy silanes and polydimethylsiloxane, each of the strength and flexibility layers exhibits an average Konig hardness value of from 5 to 32 seconds, each of the strength and flexibility layers has an average thickness of less than 0.45 mil, and the plurality of strength and flexibility layers having an average combined total post-peel thickness of from 4 to 4.8 mils. The wear layer comprises at least one member selected from the group consisting of polyurethane made from polyester diol, polyurethane made from polycarbonate diol, uv-curable polyurethane/acrylic, uv-curable polyester/acrylic, uv-curable epoxy polymer/acrylic, uv-curable polysiloxane/acrylic, uv-curable polysilazane/acrylic, uv-curable polyurea/acrylic, polyurethane/polymethyl methacrylate hybrid, copolymer made from multi-functional alkoxy silane and multi-functional silazane, copolymer made from polyaspartic acid and multi-functional isocyanate polyurethane, copolymer made from multi-functional alkoxy silane and polydimethylsiloxane, polysiloxane made from multi-functional alkoxy silane, and polysilazane made from multi-functional silazane, and the wear layer exhibiting an average Konig hardness value of from 90 to 250 seconds, and the wear layer having an post-peel average thickness of from 0.4 mil to 2 mils. The peelable surface coating has a post-peel average percent elongation (E) of at least 400%, a post-peel average break force maximum load (BF) of at least 3700 gm-Force, and an post-peel average total thickness (T) of from 4.4 to 7.5 mils, and wherein (E %)×(BF gm-Force)×(T mils)≥5×10$^6$.

In an embodiment, the plurality of strength and flexibility layers comprises at least one member selected from the group consisting of polyurethane made from polyester diol, polyurethane/polymethyl methacrylate hybrid polymer, each of the strength and flexibility layers exhibiting an average Konig hardness value of from 10 to 30 seconds, and each of the strength and flexibility layers has an average thickness of less than 0.4 mil. The wear layer comprises at least one member selected from the group consisting of polyurethane made from polyester diol, styrene/acrylic copolymer, polyurethane/acrylic hybrid polymer, polysiloxane made from multi-functional alkoxy silane, and the wear layer exhibits an average Konig hardness value of from 100 to 200 seconds. The peelable surface coating has an post-peel average total thickness of from 5 to 7 mils, and (E %)×(BF gm-Force)×(T mils)≥6×10$^6$.

In an embodiment, the multi-section substrate comprises at least one member selected from the group consisting of vinyl polymer, concrete, wood, stainless steel, aluminum, rubber, natural stone, glass, ceramic, and porcelain.

In an embodiment, the multi-section substrate comprises at least one member selected from the group consisting of concrete, wood, marble, granite, rubber, terrazzo, glass, quartz, ceramic, porcelain, and the plurality of strength and flexibility layers includes a first strength and flexibility layer which adheres directly to the substrate, without a bonding layer between the first strength and flexibility layer and the substrate.

In an embodiment, the multi-sectional substrate comprises a plurality of tiles in abutting relationship to one another at joints, with the peelable surface coating system spanning the joints between the tiles.

In an embodiment, the peelable surface coating system is a multi-cycle coating system further comprises (i) a first cycle comprising a first set of strength and flexibility layers and a first wear layer, (ii) a second cycle comprising a second set of strength and flexibility layers and a second wear layer, and (iii) a third cycle comprising a third set of strength and flexibility layers and a third wear layer. In the multi-cycle coating system, the cycles are not individually peelable, i.e., all of the coating cycles peel together in a single peeling.

In an embodiment, the first set of strength and flexibility layers comprises from 2 to 7 strength and flexibility layers each having an average thickness of from 0.1 to 0.4 mil, the second set of strength and flexibility layers comprises from 2 to 7 strength and flexibility layers each having an average thickness of from 0.1 to 0.4 mil, and the third set of strength and flexibility layers comprises from 2 to 7 strength and flexibility layers each having an average thickness of from 0.1 to 0.4 mil.

In an embodiment, the first set of strength and flexibility layers comprises from 2 to 5 strength and flexibility layers each having an average thickness of from 0.12 to 0.4 mil, and the second set of strength and flexibility layers comprises from 2 to 5 strength and flexibility layers each having an average thickness of from 0.12 to 0.4 mil, and the third set of strength and flexibility layers comprises from 2 to 5 strength and flexibility layers each having an average thickness of from 0.12 to 0.4 mil.

In an embodiment, the first set of strength and flexibility layers comprises from 3 to 5 strength and flexibility layers each having an average thickness of from 0.15 to 0.3 mil, and the second set of strength and flexibility layers comprises from 3 to 5 strength and flexibility layers each having an average thickness of from 0.15 to 0.3 mil, and the third set of strength and flexibility layers comprises from 3 to 5 strength and flexibility layers each having an average thickness of from 0.15 to 0.3 mil.

In an embodiment, the strength and flexibility layers of the first cycle have a total thickness of less than 1.5 mils, the strength and flexibility layers of the second cycle have a total thickness of less than 1.5 mils, and the strength and flexibility layers of the third cycle have a total thickness of less than 1.5 mils.

In an embodiment, the peelable coating comprising a plurality of cycles and no single cycle is peelable.

In an embodiment, the multi-section substrate comprises vinyl composition tile and the multilayer peelable surface coating comprises a bonding layer between the substrate and the first set of strength and flexibility layers. The bonding layer comprises a bonding layer polymer comprising at least one member selected from the group consisting of acrylic polymer, vinyl polymer, and styrene-butadiene polymer, and the bonding layer exhibits a Konig hardness of at least 40 seconds. The bonding layer is adhered to the substrate, and the bonding layer polymer has an acid number of at least 25 mg of potassium hydroxide per dry gram of polymer. In an embodiment, the peelable surface coating system is a multi-cycle coating system further comprises a first cycle comprising a first set of strength and flexibility layers and a first wear layer, a second cycle comprising a second set of strength and flexibility layers and a second wear layer, and a third cycle comprising a third set of strength and flexibility layers and a third wear layer. In an embodiment, the bonding layer polymer has a weight average molecular weight of at least 25,000 and a $T_g$ of from 20° C. to 140° C., or a weight average molecular weight of from 30,000 to 100,000 and a $T_g$ of from 40° C. to 120° C. The bonding layer polymer is inorganically crosslinked with a polyvalent metal ionic crosslinker comprising zinc, or more particularly, zinc ammonium carbonate. In an embodiment, the bonding layer polymer has a weight average molecular weight of less than 20,000 and a $T_g$ of at least 75° C., or a weight average molecular weight of less than 15,000 and a $T_g$ of from 90 to 150° C. The bonding layer polymer can have an acid number of at least 100 mg of potassium hydroxide per dry gram of polymer, and the bonding layer polymer is inorganically crosslinked with a polyvalent metal ionic crosslinker comprising zinc, and the bonding layer further comprises a second bonding layer polymer having an acid number of zero and a $T_g$ of less than 40° C., the second bonding layer polymer being crosslinked with an organic crosslinker.

In an embodiment, the organic crosslinker comprises at least one member selected from the group consisting of trimethylolpropane triacrylate, triallyl cyanurate, diallyl maleate, divinyl benzene, glycidyl epoxide methacrylate, acetoacetoxyethyl methacrylate, N-methylol acrylamide, and diacetone acrylamide.

In an embodiment, the bonding layer polymer is a first bonding layer polymer, and the bonding layer further comprises a second bonding layer polymer having an acid number of zero and a $T_g$ of less than 40° C., or a $T_g$ of from −40° C. to 30, or a $T_g$ of from −30° C. to 0° C., and the second bonding layer polymer is crosslinked with a polyvalent metal ionic crosslinker comprising zinc, or zinc ammonium carbonate.

In an embodiment, the third wear layer is an outermost wear layer and is the only wear layer comprising at least one member selected from the group consisting of polysiloxane, polysilazane, polyurea, epoxy polymer, uv-curable polyurethane, and uv-curable acrylic.

In an embodiment, the first set of strength and flexibility layers comprises from 3 to 5 strength and flexibility layers each having an average thickness of from 0.15 to 0.3 mil, the second set of strength and flexibility layers comprises from 3 to 5 strength and flexibility layers each having an average thickness of from 0.15 to 0.3 mil, the third set of strength and flexibility layers comprises from 3 to 5 strength and flexibility layers each having an average thickness of from 0.15 to 0.3 mil, and the peelable coating system further comprises a fourth cycle comprising a fourth set of strength and flexibility layers comprising from 3 to 5 strength and flexibility layers each having an average thickness of from 0.15 to 0.3 mil, together with a fourth wear layer. In an embodiment, the fourth wear layer is an outermost wear layer and is the only wear layer comprising at least one member selected from the group consisting of polysiloxane, polysilazane, polyurea, epoxy polymer, uv-curable polyurethane, and uv-curable acrylic.

In an embodiment, the peelable coating system further comprises a fifth cycle comprising a fifth set of strength and flexibility layers comprising from 3 to 5 strength and flexibility layers each having an average thickness of from 0.15 to 0.3 mil, together with a fifth wear layer. In an embodiment, the fifth wear layer is an outermost wear layer and is the only wear layer comprising at least one member selected from the group consisting of polysiloxane, polysilazane, polyurea, epoxy polymer, uv-curable polyurethane, and uv-curable acrylic.

A second aspect is directed to a peelable surface coating system comprising: (A) a multi-section substrate with joints between sections; (B) a multilayer peelable surface coating comprising: (1) a plurality of strength and flexibility layers comprising at least one strength and flexibility layer polymer selected from the group consisting of polyurethane, polybutadiene, polyisoprene, ethylene/propylene/diene terpolymer, polysiloxane, polyester, polyamide, polyurea, and polyether, the strength and flexibility layer polymer having a $T_g$ of less than 0° C., each of the strength and flexibility layers having an average thickness of less than 0.6 mil, with the plurality of strength and flexibility layers having an average combined total post-peel thickness of from 3.3 mils to 6 mils, and (2) a wear layer comprising at least one wear layer polymer selected from the group consisting of polyurethane, acrylic polymer, polysiloxane, polysilazane, polyester, polyamide, polyurea, and epoxy polymer, the wear layer polymer exhibiting a $T_g$ of at least 20° C., the wear layer having a post-peel average thickness of from 0.2 mil to 3 mils. The peelable surface coating system spans the joints between the sections and is peelable from both the substrate and the joints between the substrate sections, the strength and flexibility layers being between the wear layer and the substrate, with the peelable surface coating having a post-peel average percent elongation (E) of at least 350%, a post-peel average break force maximum load (BF) of at least 3000 gm-Force, and a post-peel average total thickness (T) of from 3.5 to 10 mils, and wherein: (E %)×(BF gm-Force)×(T mils)≥4×10$^6$. In an embodiment, one or more additional features of the peelable surface coating system of the second aspect are in accordance with any embodiment of the peelable surface coating system of the first aspect described above.

A third aspect is directed to a process for preparing a multi-layer peelable surface coating system, comprising: (I) depositing a waterborne strength and flexibility layer coating composition on (i) a multi-section substrate and (ii) joints between the sections, (II) allowing the strength and flexibility layer coating composition to dry to form the first strength and flexibility layer, (III) repeating steps (I) and (II) at least four additional times, to form, respectively, a second strength and flexibility layer, a third strength and flexibility layer, a fourth strength and flexibility layer, and a fifth strength and flexibility layer, each of which has an average thickness of less than 0.6 mils, with the first, second, third, fourth, and fifth strength and flexibility layers together exhibiting an average combined total post-peel thickness of from 3.3 mils to 6 mils, and (IV) depositing a wear layer coating composition over the fifth strength and flexibility layer, and (V) allowing the wear layer coating composition to dry and/or cure to form the wear layer having an average post-peel thickness of from 0.2 mil to 3 mils, and to form the peelable surface coating system. The waterborne strength and flexibility layer coating composition comprising water and at least one member selected from the group consisting of polyurethane, polybutadiene, polyisoprene, ethylene/propylene/diene terpolymer, polysiloxane, polyester, polyamide, polyurea, and polyether. The strength and flexibility layer coating composition is applied in a manner such that upon drying a resulting first strength and flexibility layer has an average thickness of less than 0.6 mils. The strength and flexibility layer coating composition is selected such that upon drying, the resulting first strength and flexibility layer exhibits an average Konig value of less than 40 seconds. The wear layer coating composition comprises at least one member selected from the group consisting of polyurethane, acrylic polymer, polysiloxane, polysilazane, polyester, polyamide, polyurea, and epoxy polymer. The wear layer coating composition is selected such that upon curing, the resulting wear layer exhibits a Konig hardness value of at least 60 seconds. The strength and flexibility layer composition and the wear layer coating composition are applied to the multi-section substrate in a manner such that the peelable surface coating spans the joints between the substrate sections and is peelable from the substrate as well as from the joints between the substrate sections, with the peelable surface coating having a post-peel average percent elongation (E) of at least 350%, a post-peel average break force maximum load (BF) of at least 3000 gm-Force, and a post-peel average total thickness (T) of from 3.5 to 10 mils, and wherein (E %)×(BF gm-Force)×(T mils)≥4×10$^6$.

In an embodiment, the peelable coating system is applied as a multi-cycle coating system with each cycle comprising a plurality of the strength and flexibility layers and a wear layer.

In an embodiment, the wear layer coating composition is a waterborne coating composition comprising water.

In an embodiment, the substrate is a floor.

In an embodiment, the peelable coating system exhibits a peel level of at least 90%, or at least 95%, or at least 99%, or 100%.

In an embodiment, the process is carried out in a manner to produce a peelable coating system in accordance any embodiment of the first aspect described above.

A fourth aspect is directed to a process for providing a multi-section substrate surface with a coating, and maintaining the multi-section substrate surface, comprising: (I) providing a stripped multi-section substrate surface having joints between the sections of the substrate surface, (II) depositing a waterborne strength and flexibility layer coating composition to (i) the surface of multi-section substrate and (ii) the joints between sections, (III) allowing the strength and flexibility layer coating composition to dry to form the first strength and flexibility layer, (IV) repeating steps (II) and (III) at least four additional times, to form, respectively, a second strength and flexibility layer, a third strength and flexibility layer, a fourth strength and flexibility layer, and a fifth strength and flexibility layer, each of which has an average thickness of less than 0.6 mils, with the first, second, third, fourth, and fifth strength and flexibility layers together exhibiting an average total thickness of from 3.3 mils to 6 mils, (V) depositing a wear layer coating composition over the fifth strength and flexibility layer, (VI) allowing the wear layer coating composition to dry and/or cure to form the wear layer and the peelable surface coating system, (VII) allowing the peelable surface coating system to be subjected to use, (VIII) peeling the peelable coating system from the multi-section substrate and from the joints between the sections of the multi-section substrate, and (IX) repeating steps (II) through (VI). The strength and flexibility layer coating composition comprises at least one member selected from the group consisting of polyurethane, polybutadiene, polyisoprene, ethylene/propylene/diene terpolymer, polysiloxane, polyester, polyamide, polyurea, and polyether. The strength and flexibility layer coating composition is applied in a manner such that upon drying a resulting first strength and flexibility layer has an average thickness of less than 0.6 mils. The strength and flexibility layer coating composition is selected such that upon drying, the resulting first strength and flexibility layer exhibits an average Konig value of less than 40 seconds. The wear layer coating composition comprises at least one member selected from the group consisting of polyurethane, acrylic polymer, polysiloxane, polysilazane, polyester, polyamide, polyurea, and epoxy polymer. The wear layer coating composition is selected such that upon drying, the resulting wear layer exhibits a Konig hardness value of at least 60 seconds. The wear layer has an average post-peel thickness of from 0.2 to 0.3 mils. The strength and flexibility layer coating composition and the wear layer coating composition are applied to the multi-section substrate in a manner such that the peelable surface coating spans the joints between the sections and is peelable from the surface of the substrate as well as from the joints between the sections, with the peelable surface coating having a post-peel average percent elongation (E) of at least 350%, a post-peel average break force maximum load (BF)

of at least 3000 gm-Force, and a post-peel average total thickness (T) of from 3.5 to 10 mils, and wherein (E %)×(BF gm-Force)×(T mils)≥4×10$^6$.

If the process utilizes a peelable coating that is a multi-cycle coating, all of the cycles are peelable at once, i.e., no single cycle or subset of the cycles is peelable while leaving earlier cycles on the substrate.

In an embodiment, wherein the multi-sectional substrate comprises 12-inch by 12-inch vinyl composition tiles and the peelable coating system exhibits a peel level of 100 percent from a perimeter-cut 30 square foot area 5 tiles wide and by 6 tiles long.

In an embodiment, the substrate is a floor.

In an embodiment, the peelable coating system exhibits a peel level of at least 90%, or at least 95%, or at least 99%, or 100%.

In an embodiment, the process is carried out in a manner to produce a peelable coating system in accordance any embodiment of the first aspect described above.

DETAILED DESCRIPTION

Figure 1:
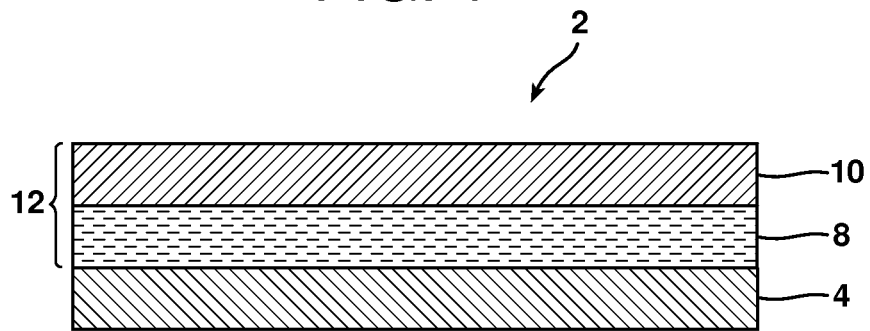
FIG. 1 is a schematic cross-sectional view of a peelable floor surface coating system.

As used herein, the phrase "peelable coating," as used with respect to a coating over a multi-sectional substrate, refers to a coating which can be physically peeled off of multiple sections of the substrate, with the peeling including peeling of that portion of the coating which spans the joints between the sections of the substrate. Such a peelable coating peels in a unitary manner off a plurality of sections such that a single piece of peeled coating has portions thereof corresponding with different sections and a portion thereof corresponding with that portion of the peelable coating that spanned the joint between the sections of the substrate.

As used herein, the phrase "peel level" refers to the percent of a coating that can be manually peeled from a designated perimeter-cut area over a multi-sectional substrate. A peel level of less than 100 percent occurs if during peeling the coating tears off, leaving a portion of the coating in the designated perimeter-cut area. Manual peeling is carried out by peeling at a rate of about 0.5 linear foot per second, by peeling the coating back so that during peeling, the peeled portion forms an included angle of about 45 degrees relative to the unpeeled portion of the coating.

In an embodiment, the peelable surface coating has a post-peel average thickness of from 3.5 to 10 mils; in another embodiment, from 3.5 to 9 mils; in another embodiment, from 3.5 to 8 mils; in another embodiment, from 3.5 to 7 mils; and in another embodiment, from 3.5 to 6 mils.

As used herein, the term "joint," as applied to multi-sectional substrates, refers to gaps between the surface substrate sections, the gaps having a width of from 0.1 mil to 125 mils, or from 1 mil to 50 mils, or from 1 mil to 250 mils, or from 1 mil to 25 mils.

As used herein, the phrase "peel force" refers to the force required to peel the peelable surface coating from the substrate, without regard to whether all of the layers of the surface coating peel cleanly from the substrate (i.e., without regard to whether part of all of a bonding layer remains on the substrate). That is, whatever force is required to peel any or all of the surface coating from the substrate is herein designated as the "peel force" between the peelable surface coating and the substrate. The phrase "peel force" also designates the force required to peel the surface coating directly from the substrate, and does not include the increase in the peel force required to peel the coating from a joint between sections. However, the tear resistance of the coating must be high enough that the coating is peelable across the joints between tile sections.

The peelable surface coating system can be made as a "single cycle" system or as a "multi-cycle" system. If as a multi-cycle system, individual cycles are not individually peelable from each other to reveal a fresh wear surface. Rather, the multi-cycle peelable surface coating system is produced by application of one cycle at a time, with the completion of at least two cycles being required to establish peelability. If applied overnight (i.e., during a period the surface is not open to the public), usually three to six cycles are needed in order to establish peelability, as the multiple layers of each cycle must each be given adequate time to dry before the next layer is applied, with the result being that the limited amount of strength and flexibility layer that can be applied overnight necessitating the application of at least three cycles in order to produce a peelable coating system.

As used herein, all references to molecular weight (Mw) refer to weight average molecular weight.

As used herein, the phrase "hybrid polymer" refers to a polymer composition having microphase separated domains of, for example, acrylic polymer and/or vinyl polymer dispersed within a continuous polyurethane matrix phase. Hybrid polymers are prepared by the polymerization of monomers to make the secondary polymer in the presence of a polyurethane emulsion.

As used herein, the phrase "physical blend" refers to a polymer composition including a mixture of two or more polymer networks that do not form an interpenetrating polymer network. For example, a physical blend polymer composition may be prepared by combining and mixing a composition including acrylic emulsion polymers with a composition including polyurethane emulsion polymers.

As used herein, the term "emulsion" is interchangeable with the terms "dispersion," "latex," or other terms describing water-borne polymers and resins that are known and used by those skilled in the art.

As used herein, the term "polyisoprene" is inclusive of isoprene homopolymer, copolymer thereof, terpolymer thereof, etc., including styrene/isoprene copolymer (including styrene/isoprene block copolymer, styrene/isoprene random copolymer), etc., as well as hydrogenated forms of all these polymers.

As used herein, the word "multi-functional" is interchangeable with the word "polyfunctional," and refers to 2 or more functional groups thereon, preferably 3 or more functional groups thereon.

As used herein, the phrase "polysiloxane made from multi-functional alkoxy silane" refers to a polysiloxane produced from silanes having at least two alkoxy groups thereon, preferably three or more alkoxy groups thereon. These multi-functional alkoxy silanes result in highly networked polysiloxanes, which can be prepared using a sol-gel process.

As used herein, the term "polyurethane" is interchangeable with the term "urethane" and includes polyurethane-acrylic physical blend, polyurethane-acrylic chemical blend, as well as polyurethanes made from the reaction of a diisocyanate (e.g., isophorone diisocyanate and toluene diisocyanate) with a diol, for example, a diol containing a polyester, a diol containing a polycarbonate, a diol containing a polyurea, a diol containing a polybutadiene, a diol containing a polyether, and a diol containing a polyamide.

As used herein, the phrase "acrylic polymer" or the term "polyacrylate" is inclusive of homopolymer and copolymer of acrylic acid and/or methacrylic acid with acrylic acid ester and/or methacrylic acid ester. The phrase "acrylic polymer" is also inclusive of copolymer made from one or more vinyl monomer, such as styrene, with any one or more of acrylic acid, methacrylic acid, acrylic acid ester, and methacrylic acid ester.

As used herein, the term "polybutadiene" is inclusive of butadiene homopolymer, copolymer thereof, terpolymer thereof, etc., including styrene/butadiene copolymer (including styrene/butadiene block copolymer, styrene/butadiene random copolymer), acrylonitrile/butadiene/styrene, etc., as well as hydrogenated forms of all these polymers.

As used herein, the term "acid number" refers to the amount of KOH required to fully neutralize a given dry sample of substance, resin, polymer, or wax and is defined as milligrams ("mg") of KOH/dry gram of substance.

As used herein "RTV silicone rubber" refers to room temperature vulcanizable silicone rubber. Both one-part systems and two-part systems are known.

As used herein, the word "drying" refers to evaporation of volatile components from a coating composition until substantial equilibrium is reached with respect to the atmosphere.

As used herein, the word "curing" refers to a chemical reaction covalently bonding organic molecules, including polymerization of monomer into polymer chains and/or crosslinking of polymer chains.

The present disclosure has potential applications on any surface where protection (e.g., scuff and black heel mark resistance, scratch resistance, slip resistance, water resistance, soil resistance, ethanol resistance, stain resistance, etc.) is desirable. Such surfaces include horizontal surfaces such as floors, food preparation surfaces, kitchen surfaces, bathroom surfaces, desks, tables, etc., as well as vertical surfaces such as walls, windows, and the like, as well as irregular surfaces such as food preparation equipment, vessels, tanks, parts, etc. The surfaces to be finished may be made from a large variety of materials, including, but not limited to, engineered stone, engineered wood, vinyl, marble, granite, terrazzo, ceramic, linoleum, wood, metal, plastic, rubber, concrete, stone, vinyl composition tiles ("VCT"), and glass. Tile substrates include vinyl composition tile, vinyl asbestos, 100% vinyl tile, factory coated plank tile, and linoleum. Stone substrates include marble, granite, slate, and travertine.

The peelable floor surface coating system is a multilayer coating system that can have the following layers, in the following order, above the substrate: (i) a base layer (optional), (ii) a bonding layer (optional), (iii) a plurality of strength and flexibility layers, and (iv) a wear layer. The base layer is used to seal a substrate (i.e., to decrease substrate porosity), and is advantageous for use on, for example, concrete, wood, unglazed ceramic, terrazzo, among others. The bonding layer is used to control the peel force between the substrate and the peelable portion of the coating system. The plurality of strength and flexibility layers are required in order to provide the coating system with peelable functionality, i.e., with the strength and flexibility to enable peeling without tearing, etc. The wear layer is required in order to provide the coating system with desired wear characteristics.

Exemplary base coatings include traditional floor finishes, including coatings such as acrylic polymer and/or polyurethane, or durable coatings (crosslinked or non-crosslinked) including uv-cured polyurethane, uv-cured acrylic polymer, polyurethane that is not uv-cured, crosslinked polyurea, crosslinked acrylic polymer, crosslinked epoxy polymer, and polysiloxane, or substrates including factory-applied coatings, concrete treatments, such as, for example, penetrating sealers, densifiers or other suitable coatings and treatments that are known to those skilled in the art. A base coating may have a dry weight coating thickness of about 0.01 mil to about 100 mils.

Figure 1A:
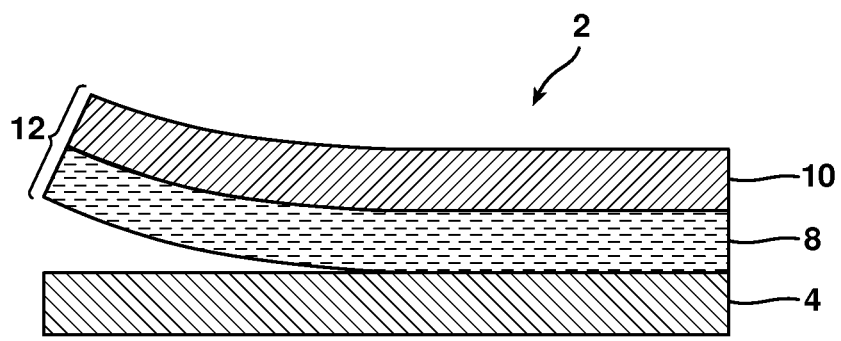
FIG. 1A is a schematic cross-sectional view of the peelable floor surface coating system of FIG. 1, with the peelable surface coating being peeled away from the floor surface.

FIG. 1 is a schematic cross-sectional view of a peelable surface coating system 2. Peelable surface coating system 2 includes substrate 4 having thereover a plurality of strength and flexibililty layers 8 (illustrated as a single layer), as well as wear layer 10. Each of strength and flexibility layers 8 was made by depositing a strength and flexibility layer coating composition over the surface of substrate 4. Wear layer 10 was made by depositing a wear layer coating composition over the surface of the plurality of strength and flexibility layers 8. The plurality of strength and flexibility layers 8, and the wear layer 10, are designed to remain adhered to one another, forming peelable coating 12, which is designed to mechanically peel away from the surface of substrate 4 to enable stripping and refinishing of substrate 4 with minimal to no damage to the surface thereof. FIG. 1A illustrates peelable coating 12 in the process of being mechanically peeled from substrate 4. Peelable coating 12 includes both the plurality of strength and flexibility layers 8, plus wear layer 10.

Figure 2:
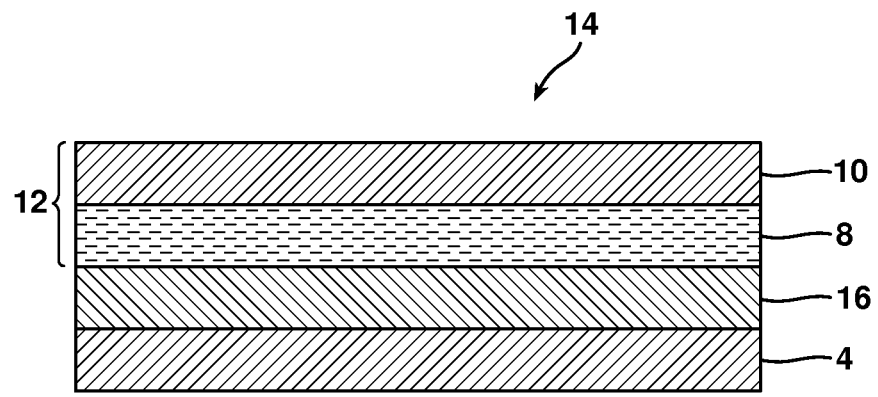
FIG. 2 is a schematic cross-sectional view of an alternative peelable floor surface coating system.
Figure 2A:
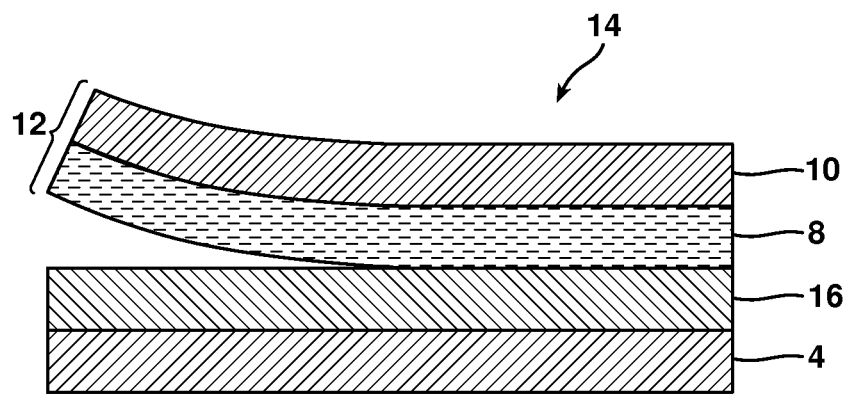
FIG. 2A is a schematic cross-sectional view of the peelable floor surface coating system of FIG. 2, with the peelable surface coating being peeled away.

FIG. 2 is a schematic cross-sectional view of a first alternative peelable surface coating system 14. Peelable surface coating system 14 includes substrate 4 having thereover bonding layer 16, a plurality of strength and flexibililty layers 8 (illustrated as a single layer), and wear layer 10. Bonding layer 16 was made by depositing a bonding layer coating composition over the surface of substrate 4. Each of strength and flexibility layers 8 was made by depositing a strength and flexibility layer coating composition over the surface of bonding layer 16. Wear layer 10 was made by depositing a wear layer coating composition over the surface of the plurality of strength and flexibility layers 8. The plurality of strength and flexibility layers 8, and the wear layer 10, are designed to remain adhered to one another, forming peelable coating 12, which is designed to mechanically peel away from the surface of bonding layer 16 to enable stripping and refinishing of substrate 4 with minimal to no damage to the surface thereof. FIG. 2A illustrates peelable coating 12 in the process of being mechanically peeled from substrate 4. Peelable coating 12 includes both the plurality of strength and flexibility layers 8, and wear layer 10.

Figure 3:
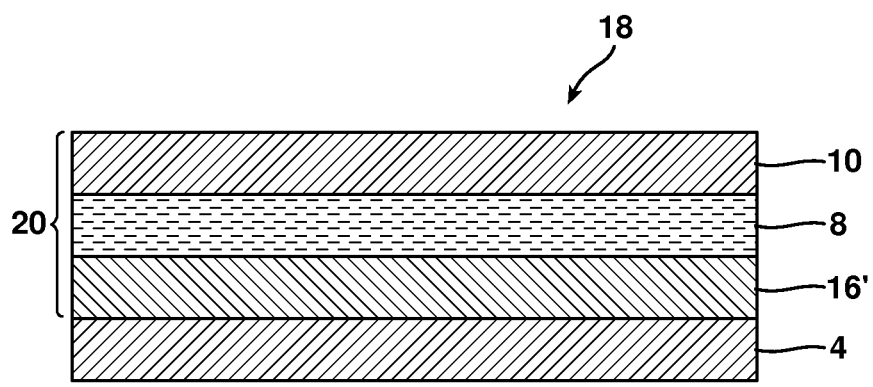
FIG. 3 is a schematic cross-sectional view of a second alternative peelable floor surface coating system.

FIG. 3 is a schematic cross-sectional view of a second alternative peelable surface coating system 18. Peelable surface coating system 18 includes substrate 4 having thereover bonding layer 16', a plurality of strength and flexibililty layers 8 (illustrated as a single layer), and wear layer 10.

Figure 3A:
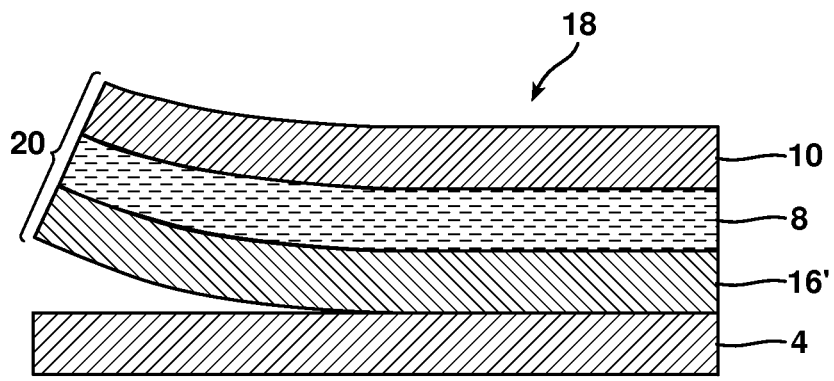
FIG. 3A is a schematic cross-sectional view of the peelable floor surface coating system of FIG. 3 with the peelable surface coating being peeled away from the floor surface.

Bonding layer 16' was made by depositing a bonding layer coating composition over the surface of substrate 4. Each of strength and flexibility layers 8 was made by depositing a strength and flexibility layer coating composition over the surface of bonding layer 16'. Wear layer 10 was made by depositing a wear layer coating composition over the surface of the plurality of strength and flexibility layers 8. Bonding layer 16', the plurality of strength and flexibility layers 8, and the wear layer 10, are designed to remain adhered to one another, forming peelable coating 20, which is designed to mechanically peel away from the surface of substrate 4 to enable stripping and refinishing of substrate 4 with minimal to no damage to the surface thereof. FIG. 3A illustrates peelable coating 20 in the process of being mechanically peeled from substrate 4. Peelable coating 20 includes bonding layer 16', the plurality of strength and flexibility layers 8, and wear layer 10.

The bonding layer coating composition can be either waterborne or solvent-based. A waterborne bonding layer coating composition can have a non-volatiles content of from 5 to 60 wt %, based on weight of coating composition, with the balance being water; or from 15 to 25 wt %, based on weight of coating composition. A solvent-based bonding layer coating composition can have a non-volatiles content of from 5 to 60 wt %, based on weight of coating composition, with the balance being solvent; or from 15 to 20 wt %, based on weight of coating composition. The bonding layer coating composition can comprise both water and solvent.

Waterborne bonding layer coating compositions suitable for use in making the bonding layer may utilize polymers made by emulsion polymerization, dispersion polymerization, suspension polymerization, and inverse-emulsion polymerization. In some embodiments, the bonding layer coating composition may include an emulsion polymer composition formed by the free radical polymerization of ethylenically-unsaturated monomers, such as, for example, an emulsion polymerization method which involves a free radical polymerization of monomer-in-water for the preparation of synthetic polymer or resin water-borne emulsions, latexes, or dispersions. The bonding layer coating composition may include acrylic emulsion polymer, vinyl emulsion polymer, and styrene-butadiene emulsion polymer, and a combination thereof.

After the bonding layer coating composition is applied and allowed to dry, the resulting bonding layer can comprise the bonding layer polymer in an amount of from 50 to 100 wt %, based on layer weight, or from 60 to 100 wt %, or from 70 to 100 wt %, or from 80 to 100 wt %, or from 90 to 100 wt %, based on layer weight.

In a first bonding layer embodiment, the bonding layer comprises a first bonding layer polymer having an acid number of at least 25 mg of potassium hydroxide per dry gram of polymer, or an acid number of from 50 to 350, or an acid number of from 50 to 250, or an acid number of from 100 to 230, the first bonding layer polymer also having a glass transition temperature ($T_g$) of from about 20° C. to about 140° C., or from 40° C. to 140° C. The first bonding layer polymer has a weight average molecular weight of at least 25,000, or a weight average molecular weight of from 30,000 to 100,000, or a weight average molecular weight of from 200,000 to 1,000,000. The first bonding layer polymer can be inorganically crosslinked with a polyvalent metal ionic crosslinker. The polyvalent metal ionic crosslinker can comprise zinc, or zinc ammonium carbonate.

In an alternative bonding layer embodiment, herein termed a second bonding layer embodiment, the bonding layer comprises a second bonding layer polymer having an acid number of zero. The second bonding layer polymer can also be crosslinked with an organic crosslinker. The second bonding layer polymer can have a gel content of at least 50%, or at least 70%, or from 75% to 95%. The second bonding layer polymer can have a $T_g$ of less than 40° C., or a $T_g$ of −40° C. to 30° C., or a $T_g$ of −30° C. to 0° C. The second bonding layer polymer can be inorganically crosslinked with a polyvalent metal ionic crosslinker, which can comprise zinc, or zinc ammonium carbonate.

In either the second or the first bonding layer embodiments, the bonding layer optionally further comprises a third bonding layer polymer having an acid number of at least 100 mg of potassium hydroxide per dry gram of polymer, or an acid number of from 100 to 350, or an acid number of from 150-250, and have a weight average molecular weight of less than 20,000 (or weight average molecular weight of less than 15,000) and a $T_g$ of at least 75° C. (or a $T_g$ of from 90° C. to 150° C.). This third bonding layer polymer can also be crosslinked with a polyvalent metal ionic crosslinker comprising zinc or zinc ammonium carbonate.

If the bonding layer polymer is crosslinked, it can comprise: (i) a mer unit derived from a multi-functional unsaturated monomer (polyethylenically unsaturated monomers containing 2 or more ethylenically unsaturated groups), and/or (ii) a mer unit derived from a multi-functional organic monomer comprising at least one member selected from the group consisting of glycidyl epoxide functional monomer, acetoacetoxy functional monomer, diacetone functional monomer, multi-functional alkoxysilane functional monomer, amine functional monomer, hydroxy functional monomer, hydrazide functional monomer, and/or (iii) a mer unit derived from a polyfunctional crosslinker (e.g., polyfunctional carbodiimide, polyfunctional isocyanate, polyfunctional aziridine, polyfunctional amine, polyfunctional hydrazide, polyfunctional epoxide, and polyfunctional hydroxyl) to crosslink with functional groups contained in the bonding layer polymer composition.

The bonding layer can optionally further comprise one or more of the following additional components: (a) surface active agent in an amount of from 0.1 to 5 wt %, based on layer weight; (b) wetting agent in an amount of from 0.01 to 5 wt %, based on layer weight; (c) leveling agent in an amount of from 0.1 to 10 wt %, based on layer weight; (d) wax emulsion in an amount of from 0.1 to 20 wt %, based on layer weight; (e) polyvalent metal ionic crosslinker in an amount of from 0.1 to 5 wt %, based on layer weight; (f) alkali soluble or dispersible resin in an amount of from 0.1 to 50 wt %, based on layer weight; (g) alkali agent in an amount of from 0.1 to 5 wt %, based on layer weight; and (h) polyfunctional crosslinker in an amount of from 0.1 to 10 wt %, based on layer weight.

In an embodiment, the bonding layer does not comprise wax. If the bonding layer does comprise wax, the wax can have an acid number of greater than 0. Alternatively, the wax can have an acid number of 0.

In some embodiments, surface-active agents can include, for example, anionic, cationic, or nonionic surfactants. Examples of anionic surfactants include, organophosphate surfactants, sulfate surfactants, sulfonate surfactants, sulfosuccinate surfactants, diethylene oxide disulfonate surfactants, sulfonamide surfactants, sulfoester surfactants. Examples of cationic surfactants include, benzyl quaternary ammonium salt, amine oxides, ethoxylated fatty amines, fatty imidazolines. Examples of nonionic surfactants include, alcohol ethoxylates, secondary alcohol ethoxylates, phenol ethoxylates, alkyl phenol ethoxylates, EO/PO blocked copolymers, sorbitan esters, ethoxylated sorbitan esters, mercaptan ethoxylates, and fatty acids such as alkali metal and amine salts of higher fatty acids having, for example, 12 to 18 carbons such as tall oil fatty acid, as well as combinations thereof.

The organic solvent can be insoluble in water, partially insoluble in water, or soluble in water. Organic solvents include glycol ether, pyrrolidone, phosphate ester, dibenzoate, monobenzoate, phthalate, alkane, cyclic siloxane, aromatic hydrocarbon, alcohol, ketone, and ester.

Wetting agents can include, for example, tributoxyethyl phosphate and fluorochemical surfactants, such as ethoxylated non-ionic fluorochemicals, anionic fluorochemical surfactants based on carboxylic acid, phosphate, sulfate, or sulfonate functionality, alcohol ethoxylate surfactants, organophosphate surfactants, organo-silicones, fluorine containing emulsion polymers or fluorine containing aqueous polymer dispersions.

Leveling agents can include, for example, tributoxyethyl phosphate, salt of alkali soluble or dispersible resin ("ASR"), salt of fatty acid, organophosphate surfactant, acetylene based surfactant, organosulfate surfactant, organosulfonate surfactant, mono and diester organosulfosuccinate surfactant, and polysiloxane surfactant.

Wax emulsions can include, for example, plant (e.g. vegetable), animal, insect, synthetic, and/or mineral waxes. Suitable waxes include Fischer-Tropsch wax, oxidized petroleum wax such as polyethylenes and polypropylenes, microcrystalline wax, carnauba, beeswax, wax based on copolymer of propylene and acrylic acid and/or methacrylic acid, wax based on copolymer of ethylene and acrylic acid and/or methacrylic acid, wax based on copolymer of ethylene and acrylic acid and methacrylic acid, wax based on copolymer of ethylene and maleic anhydride, wax based on copolymer of ethylene and styrene and wax based on terpolymer of ethylene, styrene, and vinyl monomer, paraffin, ceresin, montan, ozokerite, and maleated polypropylenes, and combinations thereof. The wax emulsion may comprise a wax with an acid number greater than one.

Polyvalent metal ionic crosslinkers include alkali earth, transition, and post-transition metal complexes consisting of a central metal ion coordination center surrounded by an array of bound molecules or ions that are coordination bonded to the metal. The polyvalent metal ionic crosslinker can be a metal salt of an organic acid and a metal chelate with polydentate coordinate bonds between, for example, a primary amine containing ligand molecules and the metal ion.

Alkali soluble or dispersible resins can include, for example, polymers that include a polymerizable organic acid moiety such as, without limitation, acrylic acid, methacrylic acid, and maleic anhydride. Such resins include acrylic ester-acrylic acid, styrene-acrylic acid, styrene-α-methyl styrene-acrylic acid, styrene-acrylic ester-acrylic acid, styrene-α-methyl styrene-acrylic ester-acrylic acid, acrylic ester-methacrylic acid, styrene-methacrylic acid, styrene-α-methyl styrene-methacrylic acid, styrene-acrylic ester-methacrylic acid, styrene-α-methyl styrene-acrylic ester-methacrylic acid, styrene-maleic anhydride, and polycarboxypolyamide.

The alkali agent can include, for example, amine, hydroxide, carbonate, hydrazide, and aziridine, which can be used to control or adjust latex pH and/or provide crosslinking with functional chemistries contained in the bonding layer polymer composition. Alkali sources include ammonium hydroxide, organic mono-, di-, and multi-functional primary, secondary, and tertiary amine, amino-functional alkoxy silane, alkali and alkali earth metal hydroxide, zinc ammonium carbonate, sodium bicarbonate, adipic dihydrazide, and polyfunctional aziridine.

Suitable polyfunctional crosslinkers include carbodiimide, isocyanate, aziridine, amine, hydrazide, hydroxyl, and epoxide.

The bonding layer can have a thickness of from 0.05 to 1 mil, or from 0.1 to 0.5 mil, or from 0.1 to 0.3 mil. In some embodiments, the bonding layer peels off with the peelable portion of the surface coating system. In other embodiments, the bonding layer does not peel off with the peelable portion of the surface coating system. In other embodiments, a portion of the bonding layer peels off with the peelable portion of the surface coating system, and a portion of the bonding layer remains on the substrate as the peelable portion of the surface coating system is peeled from the substrate.

The strength and flexibility layer coating composition can be either waterborne or solvent based. A waterborne strength and flexibility layer coating composition can have a non-volatiles content of from 20 to 60 wt %, based on weight of coating composition, with the balance being water; or from 25 to 45 wt %, based on weight of coating composition. A solvent-based strength and flexibility layer coating composition can have a non-volatiles content of from 10 to 60 wt %, based on weight of coating composition, with the balance being solvent; or from 20 to 40 wt %, based on weight of coating composition. The strength and flexibility layer coating composition can comprise both water and solvent. The strength and flexibility layer coating composition can comprise at least one member selected from the group consisting of an emulsion and/or solution containing a polyurethane, a polybutadiene, a polyisoprene, an ethylene/propylene/diene terpolymer, a polysiloxane, a polyester, a polyamide, a polyurea, and a polyether.

In some embodiments, the viscosity of the strength and flexibility coating composition can be from about 1 centipoise (cps) to about 10,000 cps, about 1 cps to about 1,000 cps, about 1 cps to about 100 cps, about 5 cps to about 90 cps, or from about 5 cps to about 80 cps. Alternatively, the viscosity of the strength and flexibility coating composition may be less than about 10,000 cps, less than about 1,000 cps, less than about 100 cps, or less than about 50 cps.

Polyurethane for use in the strength and flexibility layer coating composition may be formed by step addition (condensation) polymerization of diol and diisocyanate monomer, or precondensed oligomer diol and/or diisocyanate, and then converted into an emulsion form. Preferred polyurethane may include polyurethane made from polyester diols, polycarbonate diols, polyether diols, polybutadiene diols, polyamide diols, polyurea diols, and polyester-polyurea diols. Ionizable functional groups can be present on the diols or diisocyanates to allow greater ease of dispersing and emulsifying the polyurethane into water. In some embodiments, the polyurethane emulsion may comprise a polyurethane with an acid number greater than one.

The strength and flexibility layer polymer compositions may include a hybrid polymer. The polyurethane that can be used to prepare hybrid polymer can be any polyurethane described above. The microphase separated domains may make up from 2 to 50 wt % of the hybrid polymer, or from 5 to 45 wt %, or from 20 to 40 wt %, based on combined weight of the polyurethane and the polymer in the microphase separate domains. The microphase separated domains may comprise a polymer having a $T_g$ of from −45° C. to 150° C., or from −35° C. to 130° C., or from −25° C. to 120° C., or from −5° C. to 105° C.

The hybrid polymer can be present in an emulsion having a non-volatiles content of from 20 to 60 wt %, based on emulsion weight, with the balance being water; or from 25 to 45 wt %, based on emulsion weight. The emulsion can further contain free radical initiator in an amount of from 0.01 to 2 wt %, based on emulsion weight. The emulsion can optionally further contain alkali agent in an amount of from 0.1 to 5 wt %, and reducing agent in an amount of from 0.01 to 1 wt %, based on emulsion weight.

The hybrid polymer may be made from one or more of the following ethylenically-unsaturated monomers: styrene; substituted styrene; alkyl acrylate and methacrylate; hydroxyl functional acrylate and methacrylate; gylcidyl epoxide functional acrylate and methacrylate; acetoacetoxy functional acrylate and methacrylate; amine functional acrylate and methacrylate; alkoxy functional acrylate, methacrylate, and vinyl; acrylic and vinyl amide; α,β-ethylenically unsaturated mono- and dicarboxylic acid; vinyl ester of alkanoic acid having from 1 to about 18 carbon atoms; vinyl halide; heterocyclic vinyl; acrylonitrile; methacrylonitrile; vinyl alkyl ether having an alkyl group with 1 to about 18 carbon atoms; phosphate ester of polyethylene or polypropylene glycol methacrylate; vinyl sulfonic acid; 2-acrylamido-2-methylpropane sulfonic acid; and polyethylenically unsaturated monomer containing 2 or more ethylenically unsaturated functionality groups.

A free radical initiator can be used alone thermally or in conjunction with a reducing agent, to prepare a hybrid polymer. The free radical initiator can be peroxide, hydroperoxide, persulfate, perbenzoate, and perpivalate.

The alkali agent in the hybrid polymer can be the same as the alkali agent used in the bonding layer coating composition.

A reducing agent can be used to prepare the hybrid polymer. The reducing agent can include sodium formaldehyde sulfoxylate, ferrous salt, sodium dithionite, sodium hydrogen sulfite, sodium metabisulfite, sodium sulfite, sodium thiosulfate, ascorbic acid, erythorbic acid, sodium erythorbate.

After the strength and flexibility layer coating composition is applied and allowed to dry, the resulting strength and flexibility layer can comprise the strength and flexibility layer polymer in an amount of from 70 to 100 wt %, based on layer weight, or from 80 to 100 wt %, or from 90 to 100 wt %, or from 92 to 100 wt %, or from 95 to 100 wt %, based on layer weight. The strength and flexibility layer can optionally further comprise one or more of the following additional components: (a) surface active agent in an amount of from 0 to 10 wt %, based on layer weight; (b) wetting agent in an amount of from 0 to 5 wt %, based on layer weight; (c) leveling agent in an amount of from 0 to 10 wt %, based on layer weight; (d) wax emulsion in an amount of from 0 to 20 wt %, based on layer weight; (e) polyvalent metal ionic crosslinker in an amount of from 0 to 5 wt %, based on layer weight; (f) alkali soluble or dispersible resin in an amount of from 0 to 20 wt %, based on layer weight; (g) alkali agent in an amount of from 0 to 5 wt %, based on layer weight; and (h) polyfunctional crosslinker in an amount of from 0 to 10 wt %, based on layer weight.

The organic solvent, surface active agent, wetting agent, leveling agent, wax emulsion, polyvalent metal ionic crosslinker, alkali soluble or dispersible resin, alkali agent, and polyfunctional crosslinker components in the strength and flexibility layer coating composition can be the same as the components in the bonding layer coating composition.

The strength and flexibility layer can comprise a polymer having a glass transition temperature ($T_g$) of less than 0° C., or less than −20° C., or less than −35° C. In those embodiments in which a physical blend of polymer compositions is used, each polymer may have a different $T_g$.

The strength and flexibility layer polymer can comprise at least one member selected from the group consisting of polyurethane, polybutadiene, polyisoprene, ethylene/propylene/diene terpolymer, polysiloxane, polyester, polyamide, polyurea, and polyether. The strength and flexibility layer may comprise at least one member selected from the group consisting of polyurethane made from polyester diol, polyurethane made from polycarbonate diol, polyurethane made from polyether diol, polyurethane/polyalkyl methacrylate hybrid, styrene/butadiene random copolymer, hydrogenated styrene/butadiene block copolymer, hydrogenated styrene/isoprene block copolymer, RTV silicone rubber, copolymer made from multi-functional alkoxy silanes and polydimethylsiloxane. The polymer which gives the strength and flexibility layers their Konig hardness, and which provides the multilayer coating with its post-peel tear resistance, does not include a radiation cured polymer.

The strength and flexibility layers can exhibit an average Konig hardness value of less than 40 seconds, or from 1 to 40 seconds, or from 3 to 35 seconds, or from 5 to 30 seconds.

The plurality of strength and flexibility layers can make up from 50% to 95% of the post-peel average total thickness of the peelable surface coating, or from 60% to 90%, or from 65% to 85%, or from 70% to 80 wt %.

Each of the strength and flexibility layers can have an average thickness of less than 0.6 mil, or less than 0.54 mil, or less than 0.48 mil, or less than 0.45 mil. In the peelable coating system, the plurality of strength and flexibility layers can have an average combined total post-peel thickness of at least 2.5 mils, or at least 2.8 mils, or of at least 3.0 mils, or at least 3.2 mils, or at least 3.4 mils, or at least 3.6 mils, or at least 3.8 mils, or at least 4.0 mils, or at least 4.2 mils, or at least 4.4 mils, or at least 4.6 mils.

The wear layer coating composition can be either waterborne, solvent-based, or 100% solids. The wear layer can be formed by the drying and/or curing of the wear layer coating composition. A waterborne wear layer coating composition can have a non-volatiles content of from 10 to 60 wt %, or from 20 to 40 wt %, based on weight of coating composition. A solvent-based wear layer coating composition can have a non-volatiles content of from 10 to 60 wt %, or from 20 to 30 wt %, based on weight of coating composition. The wear layer coating composition can comprise both water and solvent.

The wear layer polymer in the wear layer coating composition may comprise at least one of polyurethane, acrylic polymer, polysiloxane, polysilazane, polyester, polyamide, polyurea, and epoxy polymer. The wear layer can optionally further comprise one or more of the following additional components: (a) surface active agent in an amount of from 0.1 to 5 wt %, based on layer weight; (b) wetting agent in an amount of from 0.01 to 5 wt %, based on layer weight; (c) leveling agent in an amount of from 0.1 to 10 wt %, based on layer weight; (d) wax emulsion in an amount of from 0.1 to 20 wt %, based on layer weight; (e) polyvalent metal ionic crosslinker in an amount of from 0.1 to 5 wt %, based on layer weight; (f) alkali soluble or dispersible resin in an amount of from 0.1 to 20 wt %, based on layer weight; (g) alkali agent in an amount of from 0.1 to 5 wt %, based on layer weight; and (h) polyfunctional crosslinker in an amount of from 0.1 to 10 wt %, based on layer weight.

The wear layer coating composition can contain the wear layer polymer, or components which polymerize in situ to form the wear layer polymer, and/or polymer which crosslinks in situ to form a crosslinked polymer network. Of the polymers to be in the wear layer composition, polysiloxane and polysilazane can be made from single component compositions that polymerize by step addition polymerization in situ after being deposited on the substrate. Polyurea, polyurethane, and epoxy polymer compositions can be two-component compositions that when mixed polymerize or crosslink in situ after being deposited on the substrate. Uv-curable polymer compositions can undergo chain addition polymerization, or ring-opening polymerization, or crosslinking in situ after upon exposure to uv-radiation.

A polysiloxane wear layer coating composition contains: (a) alkoxysilane monomer, (b) organometallic catalyst, and (c) acid catalyst. Optionally, the polysiloxane coating composition further includes: (d) alkoxysilane oligomer, (e) multi-functional alkoxysilane amine substituted monomer, (f) wetting & leveling agent (g) organic solvent, (h) polydimethylsiloxane, and (i) water. Upon deposition of the polysiloxane coating composition on the substrate, the alkoxysilane polymerizes to form a crosslinked polymer network at room temperature.

The alkoxysilane monomer is present in the polysiloxane wear layer coating composition in an amount of from 10-98 wt %, based on weight of coating composition. The organometallic catalyst is present in the coating composition in an amount of from 0.01-10 wt %, based on weight of coating composition. The acid catalyst is present in the coating composition in an amount of from 0.01-10 wt %, based on weight of coating composition. Alkoxysilane oligomer can be present in the coating composition in an amount of from 0.1-80 wt %, based on weight of coating composition. Wetting & leveling agent can be present in the coating composition in an amount of from 0.01-10 wt %, based on weight of coating composition. Multi-functional alkoxysilane amine substituted monomer can be present in the coating composition in an amount of from 0.1-40 wt %, based on weight of coating composition. Organic solvent can be present in the coating composition in an amount of from 0.1-20 wt %, based on weight of coating composition. Polydimethylsiloxane can be present in the coating composition in an amount of from 0.1-40 wt %, based on weight of coating composition. Water can be present in the coating composition in an amount of from 0.01-20 wt %, based on weight of coating composition.

The alkoxy silane monomer can be a di- or multi-functional alkoxy silane, or a di- or multi-functional alkoxy silane substituted with hydroxyl, amine, epoxide, carboxylic acid, thiol, isocyanate, and ethylenically-unsaturated functional groups. The alkoxy silane oligomer can be a di- or multi-functional alkoxy silane oligomer prepared from pre-condensed multi-functional alkoxy silane monomers having a Mw of from 500 to 20,000, and/or a di- or multi-functional alkoxy silane oligomer prepared from precondensed multi-functional alkoxy silane monomer substituted with hydroxyl, amine, epoxide, carboxylic acid, thiol, isocyanate, and ethylenically-unsaturated functional groups having a Mw of from 500 to 20,000.

The organometallic catalyst can be a transition metal or post-transition metal complex consisting of a central metal atom, or metal ion coordination center, surrounded by an array of bound molecules or ions that are directly bonded to the metal and/or ionic coordination bonded to the metal. Metal complexes can consist of direct metal-carbon molecule bonds and ionic coordination ligand molecule bonds to the metal. Preferred direct metal-carbon bonded molecules are hydrocarbon and preferred ionic coordination bonded ligand molecules are organic acids and amines.

The acid catalyst can be an organic acid and/or and inorganic mineral acid.

The wetting and leveling agent can be a fluorochemical surfactant, an ethoxylated non-ionic fluorochemical, a functional fluorochemical surfactant substituted with a carboxylic acid and/or phosphoric acid and/or sulfonic acid functionality, fluoropolymer, alcohol ethoxylate surfactant, organophosphate surfactant, organo-silicone, polyether modified polydimethylsiloxane, polyester modified polydimethylsiloxane, polyacrylate, and acetylene based surfactant.

The organic solvent can be alkane, cyclic siloxane, aromatic hydrocarbon, alcohol, ketone, ester, glycol ether, pyrrolidone, phosphate ester, dibenzoate, phthalate, and diisobutyrate.

The polydimethylsiloxane can be non-reactive or reactive. Reactive polydimethylsiloxane can be multi-functional substituted with hydroxyl, amine, silanol, alkoxy, epoxide, aziradine, hydrazide, and ethylenically-unsaturated functional group substituents.

A first polysilazane wear layer coating composition contains a mixture of: (a) polysilazane, and (b) organic solvent. The polysilazane is present in the coating composition in an amount of from 0.1-50 wt %, based on weight of coating composition. The organic solvent is present in the coating composition in an amount of from 50-99.9 wt %, based on weight of coating composition.

The organic solvent in the first polysilazane wear layer coating composition can be the same as the organic solvent used above in the polysiloxane wear layer coating composition.

A second polysilazane wear layer coating composition contains a mixture of: (a) silazane monomer, (b), organoperoxide catalyst and (c) organic solvent. Optionally, the mixture further includes (d) organometallic catalyst, (e) silazane oligomer, and (f) polysilazane. Upon deposition of the polysilazane coating composition on the substrate, the silazane polymerizes to form a crosslinked polymer network with the evaporation of the organic solvent at room temperature.

The silazane monomer can be present in the second polysilazane wear layer coating composition in an amount of from 10-98 wt %, based on weight of coating composition. The organoperoxide catalyst is present in the coating composition in an amount of from 0.1-10 wt %, based on weight of coating composition. The organic solvent is present in the coating composition in an amount of from 10-90 wt %, based on weight of coating composition. Organometallic catalyst can be present in the coating composition in an amount of from 0.1-10 wt %, based on weight of coating composition. Silazane oligomer can be present in the coating composition in an amount of from 0.1-50 wt %, based on weight of coating composition. Polysilazane can be present in the coating composition in an amount of from 0.1-50 wt %, based on weight of coating composition.

The organic solvent and organometallic catalyst components in the second polysilazane wear layer coating composition can be the same as the organic solvent and organometallic catalyst used above in the polysiloxane wear layer coating composition.

In polysilazane wear layer composition No. 1, polysilazane wear layer composition No. 2, and polysilazane wear layer composition No. 3 the polysilazane can be made by condensing one or more silazane monomer. Silazane monomer include di- and multi-functional linear and cyclic silazane, both unsubstituted as well as with multi-functional ethylenically-unsaturated substituents. Exemplary silazane monomers include hexamethyl disilazane, tetramethyl disilazane, diethyltetramethyl disilazane, dimethyltetraphenyl disilazane, tetramethyldiphenyl disilazane, hexaphenylcyclo trisilazane, hexamethylcyclo trisilazane, trimethyltrivinyl-cyclo trisilazane, and octamethylcyclo tetrasilazane.

The organoperoxide catalyst can be an organic peroxide, hydroperoxide, persulfate, perbenzoate, and/or perpivalate.

The silazane oligomer can have a Mw of from 500 to 20,000, prepared from precondensed multi-functional linear and cyclic silazane monomer, or from precondensed multi-functional linear and cyclic silazane monomer having multi-functional ethylenically-unsaturated substituents thereon.

A third polysilazane wear layer coating composition contains: (a) silazane monomer, (b), organoperoxide catalyst, (c) organometallic catalyst, and (d) organic solvent. Optionally, the third coating composition further contains: (e) silazane oligomer, (f) acrylated monomer, (g) acrylated oligomer, (h) uv-photoinitiator, and (i) polysilazane. The chemically-modified surface is irradiated with UV radiation to activate polymerization and to form a crosslinked polymer coating at room temperature.

In the third polysilazane wear layer coating composition, the silazane monomer is present in the third coating composition in an amount of from 10 to 98 wt %, based on weight of coating composition. The organoperoxide catalyst is present in the coating composition in an amount of from 0.1-10 wt %, based on weight of coating composition. The organometallic catalyst is present in the coating composition in an amount of from 0.1-10 wt %, based on weight of coating composition. The organic solvent is present in the coating composition in an amount of from 10-90 wt %, based on weight of coating composition. Silazane oligomer can be present in the coating composition in an amount of from 0.1-50 wt %, based on weight of coating composition. Acrylated monomer can be present in the coating composition in an amount of from 0.1-50 wt %, based on weight of coating composition. Acrylated oligomer can be present in the coating composition in an amount of from 0.1-50 wt %, based on weight of coating composition. Uv-photoinitiator can be present in the coating composition in an amount of from 0.1-20 wt %, based on weight of coating composition. Polysilazane can be present in the coating composition in an amount of from 0.1-50 wt %, based on weight of coating composition.

The organic solvent and organometallic catalyst components in the third polysilazane wear layer coating composition can be the same as the organic solvent and organometallic catalyst used above in the polysiloxane wear layer coating composition. The silazane monomer, organoperoxide catalyst, and silazane oligomer components in the third polysilazane wear layer coating composition can be the same as the silazane monomer, organoperoxide catalyst, and silazane oligomer components used above in the second polysilazane wear layer coating composition.

The acrylated monomer can be a mono-, di-, or poly-ethylenically-unsaturated acrylate monomer, and/or a mono-, di-, or poly-ethylenically-unsaturated acrylate monomer having hydroxyl, amine, epoxide, carboxylic acid, thiol, and/or isocyanate functional substituents thereon.

The acrylated oligomer can be a mono-, di-, or poly-ethylenically-unsaturated acrylate-substituted urethane, polyester, polyether, isocyanurate, and/or epoxy with a Mw of from 500 to 20,000.

The uv-photoinitiator can be a benzophenone, benzyldimethylketal, hydroxycyclohexylphenylketone, diethylthioxanthone, isopropylthioxanthone, dimethylhydroxyacetophenone, trimethylbenzoyldiphenylphosphine oxide, methyl-o-benzoyl-benzoate, and/or methylbenzoylformate. These uv-photoinitiators can be substituted or unsubstituted.

A first uv-curable wear layer coating composition can contain: (a) acrylated polyurethane emulsion and/or acrylated polyurethane-acrylic hybrid emulsion, and (b) uv-photoinitiator. Optionally, the uv-curable wear layer coating composition contains: (c) water, (d) wetting and leveling agent, (e) organic solvent, (f) polyvalent metal ionic crosslinker, (g) polyfunctional crosslinker and (h) defoamer. The uv-curable wear layer coating composition can be deposited, allowed to dry, and then irradiated with uv-radiation to crosslink the polymer coating at room temperature.

The acrylated polyurethane emulsion and/or acrylated polyurethane-acrylic hybrid emulsion is present in the first uv-curable wear layer coating composition in an amount of from 40 to 98 wt %, based on weight of coating composition. The uv-photoinitiator is present in the coating composition in an amount of from 0.1-20 wt %, based on weight of coating composition. Water can be present in the coating composition in an amount of from 2-75 wt %, based on weight of coating composition. Wetting and leveling agent can be present in the coating composition in an amount of from 0.01-10 wt %, based on weight of coating composition. Organic solvent can be present in the coating composition in an amount of from 0.1-20 wt %, based on weight of coating composition. Polyvalent metal ionic crosslinker can be present in the coating composition in an amount of from 0.1-10 wt %, based on weight of coating composition. Polyfunctional crosslinker can be present in the coating composition in an amount of from 0.1-10 wt %, based on weight of coating composition. Defoamer can be present in the coating composition in an amount of from 0.01-3 wt %, based on weight of coating composition. The uv-photoinitiator in the first uv-curable wear layer coating composition can be the same as the uv-photoinitiator used in the third polysilazane coating composition.

The organic solvent, and wetting and leveling agent in the first uv-curable wear layer coating composition can be the same as the organic solvent, and wetting and leveling agent used above in the polysiloxane wear layer coating composition.

The polyvalent metal ionic crosslinker and polyfunctional crosslinker components in the first uv-curable wear layer coating composition can be the same as the corresponding components used above in the bonding layer coating composition.

The defoamer can be a polysiloxane, silicone, silicone emulsion, acetylene-based surfactant, mineral oil, vegetable oil, and/or fatty alcohol.

A second uv-curable wear layer coating composition can contain: (a) acrylated monomer (b), acrylated oligomer, (c) uv-photoinitiator, and (d) acrylated amine synergist or amine synergist. Optionally, the uv-curable wear layer coating composition can further include: (e) wetting and leveling agent, (f) di- and/or multi-functional alkoxy silane monomer, (g) di- and/or multi-functional alkoxy silane oligomer, (h) organic multi-functional thiol, (i) acrylated polymer and/or oligomer, (j) organic solvent, (k) organometallic catalyst, (l) acid catalyst, and (m) defoamer. The coating composition is then irradiated with uv-radiation to activate the ethylenically-unsaturated acrylate functionality polymerization to produce a crosslinked polymer coating at room temperature.

The acrylated monomer is present in the second uv-curable wear layer coating composition in an amount of from 20 to 80 wt %, based on weight of coating composition. The acrylated oligomer is present in the coating composition in an amount of from 10 to 80 wt %, based on weight of coating composition. The uv-photoinitiator, is present in the coating composition in an amount of from 0.1 to 20 wt %, based on weight of coating composition. The acrylated amine synergist or amine synergist is present in the coating composition in an amount of from 0.1 to 10 wt %, based on weight of coating composition. Wetting and leveling agent can be present in the coating composition in an amount of from 0.01 to 10 wt %, based on weight of coating composition. Di- and/or multi-functional alkoxy silane monomer can be present in the coating composition in an amount of from 0.1 to 40 wt %, based on weight of coating composition. Di- and/or multi-functional alkoxy silane oligomer can be present in the coating composition in an amount of from 0.1 to 40 wt %, based on weight of coating composition. Organic multi-functional thiol can be present in the coating composition in an amount of from 0.1 to 50 wt %, based on weight of coating composition. Acrylated polymer and/or oligomer can be present in the coating composition in an amount of from 0.1 to 30 wt %, based on weight of coating composition. Organic solvent can be present in the coating composition in an amount of from 0.1 to 20 wt %, based on weight of coating composition. Organometallic catalyst can be present in the coating composition in an amount of from 0.1 to 10 wt %, based on weight of coating composition. Acid catalyst can be present in the coating composition in an amount of from 0.01 to 10 wt %, based on weight of coating composition. Defoamer can be present in the coating composition in an amount of from 0.01 to 3 wt %, based on weight of coating composition.

The acrylated monomer, acrylated oligomer, and uv-photoinitiator in the second uv-curable coating composition can be the same as described above for the third polysilazane wear layer coating composition.

The wetting and leveling agent, organic solvent, and acid catalyst in the second uv-curable wear layer coating composition can be the same as described above for the polysiloxane wear layer coating composition.

The di- and/or multi-functional alkoxy silane monomer, and the di- and/or multi-functional alkoxy silane oligomer, in the second uv-curable wear layer coating composition can be the same as described above for the polysiloxane wear layer coating composition.

The organic multi-functional thiol can be glycol di(3-mercaptopropionate), trimethylolpropane tri(3-mercaptopropionate), pentaerythritol tetra(3-mercaptopropionate), dipentaerythritol hexa(3-mercaptopropionate), ethoxylated-trimethylolpropane tri(3-mercaptopropionate), tris[2-(3-mercapto propionyloxy)ethyl]isocyanurate.

The acrylated polymer and/or oligomer can be a multi-functional acrylated polyurethane, polyester, and/or polyacrylic, each with a Mw greater than 20,000, and Oligomer with a Mw of from 500-20,000.

In the second uv-curable wear layer coating composition, the organometallic catalyst can be as described above for the third polysilazane wear layer coating composition.

The defoamer in the second uv-curable wear layer coating composition can be the same as described above for the first uv-curable wear layer coating composition.

The polyurea wear layer coating composition can include: (a) multi-functional organic isocyanate, (b) multi-functional organic amine, and (c) organometallic catalyst. Optionally, the polyurea coating composition further includes: (d) organic solvent, (e) wetting and leveling agent, (f) multi-functional organic hydroxyl, (g) tertiary monoamine catalyst, and (h) defoamer. The polyurea coating composition can be cured at room temperature to produce a crosslinked polymer coating.

The multi-functional organic isocyanate is present in the polyurea wear layer coating composition in an amount of from 40 to 60 wt %, based on weight of coating composition. The multi-functional organic amine is present in the coating composition in an amount of from 40 to 60 wt %, based on weight of coating composition. The organometallic catalyst, is present in the coating composition in an amount of from 0.1 to 10 wt %, based on weight of coating composition. Organic solvent can be present in the coating composition in an amount of from 0.1 to 20 wt %, based on weight of coating composition. Wetting and leveling agent can be present in the coating composition in an amount of from 0.01 to 10 wt %, based on weight of coating composition. Multi-functional organic hydroxyl can be present in the coating composition in an amount of from 0.1 to 30 wt %, based on weight of coating composition. Tertiary monoamine catalyst can be present in the coating composition in an amount of from 0.1 to 10 wt %, based on weight of coating composition. Defoamer can be present in the coating composition in an amount of from 0.01 to 3 wt %, based on weight of coating composition.

The multi-functional organic isocyanate can be (i) an aliphatic, cycloaliphatic, or aromatic monomer with a Mw less than 500, (ii) an aliphatic oligomer or resin with a Mw from 500 to 20,000, or (iii) an aliphatic; polyester, polyacrylic, or polyurethane, with a Mw greater than 20,000.

The multi-functional organic amine can be (i) an aliphatic, cycloaliphatic, or aromatic monomer with a Mw less than 500, (ii) an aliphatic oligomer or resin with a Mw from 500 to 20,000, or (iii) an aliphatic; polyester, polyacrylic, polyether, polyaspartic acid, polyaspartic acid ester, or polyurethane, with a Mw greater than 20,000.

The multi-functional organic hydroxyl can be (i) an aliphatic or aromatic monomer with a Mw less than 500, (ii) an aliphatic oligomer or resin with a Mw from 500 to 20,000, or (iii) an aliphatic; polyester, polyacrylic, polyether, or polyurethane, with a Mw greater than 20,000.

In the polyurea wear layer coating composition, the organometallic catalyst can be as described above for the third polysilazane wear layer coating composition.

The wetting and leveling agent and organic solvent in the polyurea wear layer coating composition can be the same as described above for the polysiloxane wear layer coating composition.

The defoamer in the polyurea wear layer coating composition can be the same as described above for the first uv-curable wear layer coating composition.

The polyurethane wear layer coating composition contains: (a) multi-functional organic isocyanate, (b) multi-functional organic hydroxyl, and (c) organometallic catalyst. Optionally, the mixture can further include: (d) organic solvent, (e) wetting and leveling agent, (f) multi-functional organic amine, (g) tertiary monoamine catalyst, and (h) defoamer. The polyurethane coating composition can be cured at room temperature to produce a crosslinked polymer coating.

The multi-functional organic isocyanate is present in the polyurethane wear layer coating composition in an amount of from 40 to 60 wt %, based on weight of coating composition. The multi-functional organic hydroxyl is present in the coating composition in an amount of from 40 to 60 wt %, based on weight of coating composition. The organometallic catalyst, is present in the coating composition in an amount of from 0.1 to 10 wt %, based on weight of coating composition. Organic solvent can be present in the coating composition in an amount of from 0.1 to 20 wt %, based on weight of coating composition. Wetting and leveling agent can be present in the coating composition in an amount of from 0.01 to 10 wt %, based on weight of coating composition. Multi-functional organic amine can be present in the coating composition in an amount of from 0.1 to 30 wt %, based on weight of coating composition. Tertiary monoamine catalyst can be present in the coating composition in an amount of from 0.1 to 10 wt %, based on weight of coating composition. Defoamer can be present in the coating composition in an amount of from 0.01 to 3 wt %, based on weight of coating composition.

The multi-functional organic isocyanate, and multi-functional organic hydroxyl, and the multi-functional organic amine in the polyurethane wear layer coating composition can be the same as described above for the polyurea wear layer coating composition.

The wetting and leveling agent and organic solvent in the polyurethane wear layer coating composition can be the same as described above for the polysiloxane wear layer coating composition.

The defoamer in the polyurethane wear layer coating composition can be the same as described above for the first uv-curable wear layer coating composition.

A first epoxy polymer wear layer coating composition contains: (a) multi-functional organic epoxide, (b) a multi-functional organic amine, and (c) polyamido-amine curing co-agent. Optionally, the first epoxy polymer coating composition further includes: (d) organic solvent, (e) wetting and leveling agent, (f) polyamide, (g) multi-functional organic hydroxyl, (h) tertiary or secondary monoamine catalyst, (i) dicyandiamide accelerator, (j) mono-epoxide diluent, and (k) defoamer. The coating composition can be cured to produce a crosslinked polymer coating at room temperature.

The multi-functional organic epoxide is present in the first epoxy polymer wear layer coating composition in an amount of from 40-60 wt %, based on weight of coating composition. The multi-functional organic amine is present in the coating composition in an amount of from 40-60 wt %, based on weight of coating composition. The polyamido-amine curing co-agent is present in the coating composition in an amount of from 0.1 to 30 wt %, based on weight of coating composition. Organic solvent can be present in the coating composition in an amount of from 0.1 to 40 wt %, based on weight of coating composition. Wetting and leveling agent can be present in the coating composition in an amount of from 0.01 to 10 wt %, based on weight of coating composition. Polyamide functional aliphatic resin and polymer can be present in the coating composition in an amount of from 0.1 to 30 wt %, based on weight of coating composition. Multi-functional organic hydroxyl can be present in the coating composition in an amount of from 0.1 to 30 wt %, based on weight of coating composition. Secondary or tertiary monoamine catalyst can be present in the coating composition in an amount of from 0.1 to 10 wt %, based on weight of coating composition. Dicyandiamide accelerator can be present in the coating composition in an amount of from 0.1 to 10 wt %, based on weight of coating composition. Mono-epoxide diluent can be present in the coating composition in an amount of from 0.01 to 20 wt %, based on weight of coating composition. Defoamer can be present in the coating composition in an amount of from 0.01 to 3 wt %, based on weight of coating composition.

The multi-functional organic epoxide can be at least one member selected from the group consisting of (i) an aliphatic, cycloaliphatic, or aromatic monomer with a Mw less than 500, (ii) an aliphatic oligomer or resin with a Mw from 500 to 20,000, (iii) an aliphatic, polyester, polyacrylic, polyether, or polyurethane with a Mw greater than 20,000, or (iv) epoxide resin including glycidylamine, bisphenol A, bisphenol F, and novolac (including epoxy phenol novolac resin, epoxy cresol novolac resin).

The multi-functional organic hydroxyl, and multi-functional organic amine in the first epoxy polymer wear layer coating composition can be the same as described above for the polyurea wear layer coating composition.

The wetting and leveling agent and organic solvent in the first epoxy polymer wear layer coating composition can be the same as described above for the polysiloxane wear layer coating composition.

The defoamer in the first epoxy polymer wear layer coating composition can be the same as described above for the first uv-curable wear layer coating composition.

A second epoxy polymer wear layer coating composition contains: (a) multi-functional organic epoxide, (b) multi-functional organic amine, (c) polyamido-amine curing co-agent, and (d) diaryl iodonium salt uv-photoinitiator. Optionally, the second epoxy polymer coating composition further contains: (e) organic solvent, (f) wetting and leveling agent, (g) polyamide, (h) multi-functional organic hydroxyl, (i) tertiary or secondary monoamine catalyst, (j) dicyandiamide accelerator, and (k) mono-epoxide diluent, and (l) defoamer. The second epoxy polymer coating composition can be irradiated with uv-radiation to activate the epoxide polymerization at room temperature, to produce a crosslinked polymer coating.

The multi-functional organic epoxide is present in the second epoxy polymer wear layer coating composition in an amount of from 40 to 90 wt %, based on weight of coating composition. The multi-functional organic amine is present in the coating composition in an amount of from 0.1 to 30 wt %, based on weight of coating composition. The polyamido-amine curing co-agent is present in the coating composition in an amount of from 0.1 to 30 wt %, based on weight of coating composition. The diaryl iodonium salt uv-photoinitiator is present in the coating composition in an amount of from 0.1 to 20 wt %, based on weight of coating composition. Organic solvent can be present in the coating composition in an amount of from 0.1 to 40 wt %, based on weight of coating composition. Wetting and leveling agent can be present in the coating composition in an amount of from 0.01 to 10 wt %, based on weight of coating composition. Polyamide can be present in the coating composition in an amount of from 0.1 to 30 wt %, based on weight of coating composition. Multi-functional organic hydroxyl can be present in the coating composition in an amount of from 0.1 to 30 wt %, based on weight of coating composition. Tertiary or secondary monoamine catalyst can be present in the coating composition in an amount of from 0.1 to 10 wt %, based on weight of coating composition. Dicyandiamide accelerator can be present in the coating composition in an amount of from 0.1 to 10 wt %, based on weight of coating composition. Mono-epoxide diluent can be present in the coating composition in an amount of from 0.01 to 20 wt %, based on weight of coating composition. Defoamer can be present in the coating composition in an amount of from 0.01 to 3 wt %, based on weight of coating composition.

The multi-functional organic hydroxyl, and multi-functional organic amine in the second epoxy polymer wear layer coating composition can be the same as described above for the polyurea wear layer coating composition.

The multi-functional organic epoxide in the second epoxy polymer wear layer coating composition can be the same as described above for the first epoxy polymer wear layer coating composition.

The wetting and leveling agent and organic solvent in the second epoxy polymer wear layer coating composition can be the same as described above for the polysiloxane wear layer coating composition.

The defoamer in the second epoxy polymer wear layer coating composition can be the same as described above for the first uv-curable wear layer coating composition.

The wear layer provides the multilayer coating system with durability, i.e., resistance to wearing. The wear layer has a higher hardness value than the hardness value of the plurality of the strength and flexibility layers. Wear layers exhibit a Konig hardness value of at least 60 seconds, or at least 70 seconds, or at least 80 seconds, or from 90 to 250 seconds. Wear layers can be made from polyurethane, acrylic polymer, polysiloxane, polysilazane, polyester, polyamide, epoxy polymer, and polyurea. The wear layer may comprise at least one member selected from the group consisting of polyurethane made from polyester diol, polyurethane made from polycarbonate diol, uv-curable polyurethane/acrylic, uv-curable polyester/acrylic, uv-curable epoxy polymer/acrylic, uv-curable polysiloxane/acrylic, uv-curable polysilazane/acrylic, uv-curable polyurea/acrylic, polyurethane/polymethyl methacrylate hybrid, copolymer made from multi-functional alkoxy silane and multi-functional silazane, copolymer made from polyaspartic acid and multi-functional isocyanate polyurethane, copolymer made from multi-functional alkoxy silane and polydimethylsiloxane, polysiloxane made from multi-functional alkoxy silane, and polysilazane made from multi-functional silazane. The wear layer polymer can have a $T_g$ of at least 20° C., or at least 35° C., or at least 45° C.

In some embodiments, the viscosity of the wear layer coating composition can be from about 1 centipoise ("cps") to about 10,000 cps, about 1 cps to about 1,000 cps, about 1 cps to about 100 cps, about 1 cps to about 50 cps, or from about 1 cps to about 30 cps. In some embodiments, the viscosity of the wear layer coating composition may be less than about 10,000 cps, less than about 1,000 cps, less than about 100 cps, or less than about 50 cps.

Additional components that affect the optical properties ("optical components") of the wear layer may be added to the wear layer coating composition in order to reduce the glossiness of the wear layer and to produce a matte finish. A matte finish can improve the appearance of the floor by making defects less noticeable, and can give the floor a more uniform appearance. Suitable matte optical components may include, fumed silica, silica gels, magnesium aluminum silicate clays such as smectite clays, ethoxylated or propoxylated polyethylene, xanthan gum, emulsion polymer pigments, and hollow glass microspheres. The components that are added to reduce gloss and produce a matte finish can have a different index of refraction than the strength and flexibility layers, the optional bonding layer, and the optional base layer. The optical components may comprise about 0 wt % to about 10 wt %, about 0.01 wt % to about 9 wt %, or about 0.1 wt % to about 5 wt %, based on weight of the wear layer coating composition.

In an embodiment, the multilayer coating system can be a single cycle system having a plurality of strength and flexibility layers capped off with an outermost layer which is a wear layer. Alternatively, the coating system can be a multi-cycle coating system with each cycle comprising a plurality of strength and flexibility layers capped off with a wear layer. In a multicycle coating system, each cycle is capped off with a wear layer.

Additional components that can be added to any of the compositions described and/or illustrated herein include embedded particles, such as abrasives to increase traction and prevent slipping. Suitably, the particles have a size of about 50 to about 500 microns.

Another component that can be added to any of the compositions described and/or illustrated herein is an optical component such as a reflective particle material that improves the appearance of the floor and can enhance the lighting of a space in which the peelable floor surface coating system is installed. Suitably, these include glass microspheres or metallized glass microspheres ranging in size from about 1 to about 100 micrometers. Among other advantages, addition of one or more components such as those listed above which change the optical properties of a layer can aid proper application of the coatings, insofar as the added components help in visualizing where the coatings have and have not been applied.

Before finishing or coating a floor surface with a peelable floor surface coating system, the floor surface can be cleaned or stripped of any other finish or dirt, using chemical or mechanical stripping. After the floor surface has been allowed to dry following stripping, the optional base coat, the optional bonding layer, the plurality of strength and flexibility layers, and the wear layer(s) can be applied to the surface to provide the multilayer peelable coating system. Coating compositions can be applied utilizing a mop and bucket, a flat mop, a T-bar, a roller applicator, or other application device and technique known to those of skill in the art. In some embodiments, coating compositions are applied at a coating rate of about 125 square feet per gallon to 4,000 square feet per gallon, depending at least in part upon the viscosity of coating compositions. For a composition with a higher viscosity, it may be desirable to use an applicator that rolls on or spreads the composition, such as a T-bar, pad, or roller. In some embodiments, coating compositions are allowed to dry for about 30-120 minutes per coat depending on the amount of coating being deposited.

Once the peelable coating system has undergone traffic, wear, and/or damage, it can be removed by physical peeling. Peeling can be accomplished by making a small, inconspicuous cut through the peelable coating. A razor blade or other suitable implement is used to make an outline cut around the area to be peeled. Then a corner edge of the peelable coating is grasped by hand and/or with a tool, followed by peeling the peelable coating away from the substrate. Peeling can be performed in portions, or in one large sheet, with peeling continuing across the multi-sectional substrate, i.e., across the joints. A tool that scores the layers and includes a coating pickup roller can be used and run over the substrate (e.g., floor) to enable peeling of the coating in portions, each portion including peeling the coating across the joints between sections of the multi-sectional substrate. After the peeling of the peelable coating, including removal of the coating from the joints between sections of the substrate, a new peelable coating can be applied over the substrate, with the new coating spanning the joints between the sections of the multi-sectional substrate.

It may be desirable in some cases to repair only a damaged area of the peelable coating. To accomplish this, the damaged area can be removed using any suitable technique, such as cutting out using a razor blade or other tool suitable for cutting the layers, and peeling away only that portion of the peelable coating covering the cut out area, to produce an exposed surface. After removal, the multilayer peelable coating system can be re-applied to the exposed surface to form a repaired area.

The physical properties of various multilayer peelable floor coating systems were measured using various ASTM test methods, including: ASTM D6862-11, ASTM D882-09, ASTM D1938-08 (Trouser Tear Test), and ASTM D4366-95 (Konig Coating Hardness). All measurements were conducted on samples that had been conditioned for at least 2 hours in a controlled temperature and humidity chamber at 72° F. and 50% relative humidity (% RH). Moreover, all testing was conducted under these same conditions. All reported physical property measurements reported below are average values from the testing of from three to five test specimens.

Physical property testing evaluations of multilayer peelable floor coating systems referencing ASTM test methods; ASTM D6862-11, ASTM D882-09, ASTM D1938-08 (Trouser Tear Test) were determined using an INSTRON 3345 constant-rate-of-extension (CRE) single column mechanical testing instrument (obtained from INSTRON Industrial Products of Norwood, Mass.) with a 500 N (50,985 g-Force) load cell capacity. For each assessment requiring a film thickness, the thickness measurement was made in accordance with ASTM D1005-95, using a Mitutoyo Digimatic Thickness Gauge (model ID-C112EXBS, 0.00005 inch precision), spring loading anvil and contact point thickness measurement mechanism, obtained from Mitutoyo Corporation of Kawasaki, Kanagawa, Japan.

All peel force assessments were made from single 12"×12" coated vinyl composition tiles coated with a multilayer coating system. In carrying out the peel force test, a 12"×12" coated VCT was cut once, using a breaker bar type cutter, to provide a 3"×12" piece of tile having the coating thereon. Three edges were original edges, while one edge was freshly cut. A razor blade was used to make a total of three straight lengthwise cuts through only the coating, i.e., not through the tile. A first razor blade cut through the coating (but not through the tile) was made down the length of the 3"×12" coated tile, i.e., along the lengthwise centerline. A second razor blade cut was made parallel to the first cut and 0.5" from a first side edge, the second cut being one inch from the first cut. A third razor blade cut was made parallel to the first cut. A third cut was made parallel to the first cut and 0.5" from a second side edge, the third cut being also one inch from the first cut. This provided a total of two samples for peel testing. Each sample was 1-inch wide and 12-inches long.

A first peel test sample was tested by first manually peeling, from the first sample, a 1-inch wide portion about 1.5 inches long of one of the two one-inch wide test strips on the 3"×12" piece of VCT. In conducting the peel force test, the 3"×12" coated tile having the razor blade cuts therein was mounted on (i.e., held down on) a custom made 90-degree peel test fixture believed to be substantially identical to the 90 degree peel test fixture Model 2820-028 that can be obtained from INSTRON Industrial Products.

The peel force of the test samples was determined in accordance with ASTM D6862-11. The manually peeled end of the sample specimen was then placed into the clamp of the INSTRON mechanical testing instrument, with the clamp being positioned 0.5 inch directly above the test specimen so that the manually peeled portion of the test specimen was positioned at a 90 degree angle to a remaining (unpeeled) portion of the test specimen. The VCT was rigidly clamped to the moveable table mounted over a track. The table rolled in response to pull from the INSTRON mechanical testing instrument, i.e., as the coating was peeled from the VCT. The moveable table was fixed to a track so that neither the tile nor the table could rise up due to the application of force from the INSTRON mechanical testing instrument. The moveable table moved laterally as the INSTRON applied force to peel the coating from the tile, so that a substantially 90 degree angle was maintained between the peeled and unpeeled portions of the test specimen. Peel test specimens were assessed by peeling a one-inch wide film strip 90° to the film surface from the VCT substrate with a peel rate of about 1,000 millimeters/minute, for a distance of 4 inches. The peel force average load value, in units of gm-Force, was determined and provided by the INSTRON mechanical testing instrument.

Then the INSTRON clamp was lowered back to its initial position (0.5 inch above the table) and the peeled portion of the coating re-clamped in the INSTRON mechanical testing instrument in a manner identical to the set up when the first test was initiated. The sample was then peeled a further four inches by the INSTRON mechanical testing instrument, thereby producing a second peel force average load value from the same test strip. This process was repeated for the second strip, to provide a total of four average peel force determinations from the INSTRON mechanical testing instrument.

The INSTRON mechanical testing instrument was used to assess post-peel break force maximum load and post-peel elongation on 1-inch wide, 6-inch long peeled coating samples. The coating samples had been manually peeled from a 12"×12" VCT. Again, a razor blade was used to slit the coating in parallel lines 1-inch apart, with the coating being manually peeled for a distance of at least 6 inches. Manual peeling was done slowly in order to minimize any elongation of the coating during peeling. The length of the peeled sample was compared to the length of exposed VCT after termination of peeling, to determine whether and to what degree the sample was stretched. In each case, the length of the peeled coating was substantially identical to the length of the exposed area of the VCT.

In accordance with ASTM D882-09, the resulting peeled sample was placed into the clamps of the Instron mechanical testing instrument while the INSTRON clamps were spaced 3 inches apart. The test was then performed by placing an extension force on the sample specimen of 30 millimeters/minute (mm/min) until the sample broke. The break force maximum load and the percent elongation (%) exhibited by the sample specimen were recorded in units of gram-Force (gm-Force) and percent elongation, respectively. From 4 to 6 tests were run and the results averaged.

Maximum peak load tear force was assessed using the INSTRON mechanical testing instrument on a peeled film test specimen having a length of 6 inches and a width of 1 inch. The test specimen was cut and manually peeled from VCT in the same manner described above.

The maximum peak load tear force was determined in accordance with ASTM D1938-08 (Trouser Tear Test). Each 1"×6" test specimen for the Trouser Tear Test was modified by cutting a 1.5 inch slit with a fresh #9 razor blade directly down the middle of one end of the 6 inch length film strip, producing two 1.5 inch by 0.5 inch "trouser legs." Each of the trouser legs of the sample specimen was then placed into a respective clamp of the INSTRON mechanical testing instrument with the sample notch cut centered between the two INSTRON mechanical testing instrument clamps that were spaced 0.5 inch apart. The test was then performed by placing an extension force on the sample specimen of 30 millimeters/minute (mm/min) for 100 mm or until the sample broke. The maximum peak load force exhibited on the sample specimen was recorded at 100 mm extension or at film break in units of gram-Force (gm-Force). The maximum peak load tear force was a measurement of tear resistance. From 4 to 6 tests were run and the results averaged.

Konig hardness is a standard test method for determining the hardness of coatings. The Konig hardness test is a pendulum-based damping test method in accordance with ASTM D4366-95. The Konig test was carried out by first preparing a sample of a 25 wt % NV coating composition to make a coating layer to be tested (for every coating composition tested, the % NV of the composition was adjusted so that 1 ml of composition deposited onto the slide was a composition having 25 wt % NV, in order to eliminate hardness differences resulting from % NV differences). The sample was prepared by cast applying, through a pipette, one milliliter of liquid coating composition onto the surface of a 75 mm×38 mm×1.0 mm thick glass microscope slide. A pre-cleaned FISHER brand plain glass microscope slide (Fisher Scientific, Pittsburgh, Pa.) was used for all the Konig tests. Using the tip of the pipette, the coating composition was manually spread across the entire surface of the slide so that the coating composition was even across the entire surface of the slide. The slide having the coating composition thereon was positioned on a level surface during casting.

Because some coatings harden faster than others, the hardness of all samples was measured two weeks after the coating composition was applied to the slide.

Konig hardness measurements were carried out using a BYK-Mallinckrodt Pendulum Hardness Tester (model 5840—dual Konig and Peroz modes, Byk Mallinckrodt GmbH, Germany) using the Konig testing mode. The coating glass slide specimen was placed in the pendulum hardness tester and the pivot balls (30 mm apart) of the pendulum were placed to rest freely on the coating surface. The pendulum was then moved to its starting position and the electronic counter was zeroed. The pendulum was then released and allowed to swing freely on top of the coating surface until the electronic counter stopped. This number value was recorded as the Konig hardness in units of seconds. Three Konig hardness measurements were taken equidistant along the 75 mm length of the coating specimen (i.e., with the balls centered at 19 mm, 38 mm, and 56 mm) with the balls resting on the centerline running the length of the coating. For each sample, the 3 Konig hardness measurements were then averaged and reported along with the time elapsed after the liquid coating had been applied to the surface of the microscope slide (i.e., the time difference between the time the liquid coating had been applied to the surface of the microscope slide and the time of the Konig hardness measurement).

As reported herein, all polymer and resin glass transition temperature ($T_g$) values were determined by differential scanning calorimetry (DSC) in accordance with ASTM D7426-08.

As reported herein, all polymer and resin weight average molecular weight (Mw) references were determined by gel permeation chromatography (GPC), calibrated with narrow molecular weight distribution polystyrene standards in accordance with ASTM D5296-11.

As reported herein, all substance, resin, polymer, or wax acid number references were determined by a colorimetric titration method to determine acid number, and is defined as milligrams ("mg") of KOH/dry gram of substance, and is performed in accordance with ASTM methods D974-12 and D1639-90.

In an embodiment, the peelable coating system can be peeled from the substrate with an average peel force of from 50 grams force to 1000 grams force, or 100 grams force to 800 grams force, or from 150 grams force to 650 grams force, or from 200 grams force to 500 grams force, or from 250 grams force to 350 grams force. Peel force was measured in accordance with ASTM D6862-11.

EXAMPLES

Peelable Coating System on Vinyl Composition Tile Flooring

Multilayer peelable floor coating systems were prepared with a bonding layer adhered directly against the surface of the vinyl composition tile (VCT). Each of the layers was laid down from a waterborne composition. A bonding layer was first laid down to control the level of adhesion between the VCT and the remainder of the coating system. The bonding layer also served to control the peel force from the VCT.

A plurality of relatively thin strength and flexibility layers were then laid down on top of the bonding layer. Because the coating composition used to form the strength and flexibility layers was also waterborne, the strength and flexibility layers were laid down thin enough to avoid undesirable optical and structural defects that are a common result of heavier applied waterborne coatings.

A wear layer was laid down on top of the strength and flexibility layers. The wear layer was made from a harder and less flexible composition that exhibited wear properties superior to the strength and flexibility layers. However, the wear layer was not strong and flexible enough to provide peelability in the absence of the strength and flexibility layers.

The plurality of strength and flexibility layers plus the accompanying wear layer on top thereof was considered to be a single "cycle" in the application of the multilayer coating system. In the examples which follow, the bonding layer, taken together with a single cycle of four strength and flexibility layers and the wear layer on top thereof, was not peelable. Rather, peelability was only achieved upon the application of a plurality of cycles on top of the bonding layer, as the total thickness of the strength and flexibility layers was only about 1 mil per cycle, and peelability was not achieved until the total thickness of the strength and flexibility layers was at least 2.2 mils. More particularly, peelability across joints between tiles was not considered adequate with a total thickness of the strength and flexibility layers at about 2.2 mils, which occurred with the application of three cycles. However, adequate peelability was achieved upon a total thickness of the strength and flexibility layers of about 3.1 mils (four cycles). Complete peelability was achieved upon a total thickness of the strength and flexibility layers of about 4.3 mils (five cycles).

In the description of Examples 1-15 below, first the various coating compositions are described in terms of their composition and how they were prepared. Four different bonding layer compositions were prepared and tested. Seven different strength and flexibility layer compositions were prepared. Three different wear layer compositions were prepared.

Various bonding layer compositions, strength and flexibility layer compositions, and wear layer compositions were then used to prepare three, four, and five-cycle multilayer coating systems on VCT floor sections made from a plurality of tiles having joints between the tiles (Examples 1-9). In addition, single vinyl composition tiles were coated with four-cycle multilayer coating systems (Examples 10-15). The peelability of the various coating systems from the floor sections and the single tiles was then evaluated.

Bonding Layer Compositions BLC1 Through BLC4

Bonding layer coating compositions 1, 2, 3, and 4 (BLC1-BLC4) were prepared using the ingredients and order of addition set forth in Table A, below. BLC1-BLC4 varied in ingredient type and level, as set forth in Table A. Bonding layer coating compositions BLC1, BLC2, and BLC4 were prepared following the below-described procedure for the preparation of BLC3, with the following exceptions: BLC1 and BLC2 did not contain ZAC; BLC2 did not contain ASR B-33; and BLC4 did not contain BLCP1, CAPSTONE FS-60, $NH_4OH$, or ASR B-33.

TABLE A

Bonding Layer Coating Compositions BLC1 through BLC4

| Ingredient | Order of Addition | BLC1 | BLC2 | BLC3 | BLC4 |
|---|---|---|---|---|---|
| DI Water | 1 | 33.8598 | 49.4305 | 32.5798 | 38.066 |
| CARBITOL DE | 2 | 0.3973 | 0.58 | 0.3973 | 5.95 |
| CARBITOL DB | 3 | 0.3973 | 0.58 | 0.3973 | 0.47 |
| KP-140 | 4 | 0.3973 | 0.58 | 0.3973 | 3.3 |
| CAPSTONE FS-60 (40%) | 5 | 0.0134 | 0.0195 | 0.0134 | 0.0 |
| ZONYL FSJ (40%) | 6 | 0.0 | 0.0 | 0.0 | 0.024 |
| $NH_4OH$ (28%) | 7 | 0.1987 | 0.29 | 0.1987 | 0.0 |
| BLCP1 (40%) | 8 | 33.2362 | 48.52 | 33.2362 | 0.0 |
| BLCP2 (35%) | 9 | 0.0 | 0.0 | 0.0 | 44.4 |
| ASR B-33 (25.4%) | 10 | 31.5 | 0.0 | 31.5 | 0.0 |
| ZAC (15% ZnO) | 11 | 0.0 | 0.0 | 1.28 | 7.79 |
| Total Ingredients | | 100.0000 | 100.0000 | 100.0000 | 100.000 |
| Coating % NV | | 21.7% | 20.0% | 21.9% | 20.0% |

ZONYL FSJ wetting and leveling agent having 40% active fluorochemical, from DuPont.

Procedure for the Preparation of BLC3

To a 250 mL beaker equipped with agitation means comprising a magnetic stir plate and a 1.5 inch TEFLON-coated magnetic stir bar was charged in the following order; 32.5798 gms deionized water (DI water) stirred at about 150 rpm. To the beaker contents were added: (i) 0.3973 gm CARBITOL DE diethylene glycol monoethyl ether, from The Dow Chemical of Midland, Mich.; (ii) 0.3973 gm CARBITOL DB diethylene glycol monobutyl ether, also from Dow; (iii) 0.3973 gm KP-140 tributoxyethyl phosphate, from Chemtura of Middlebury, Conn.; (iv) 0.0134 gm CAPSTONE FS-60 wetting and leveling agent having 40% active fluorochemical, from du Pont of Wilmington, Del.; (v) 0.1987 gm ammonium hydroxide in the form of a 28 wt % solution of ammonia in water, from Sigma-Aldrich of St. Louis, Mo. The contents of the beaker were mixed for 5 minutes. After mixing, 33.2362 gms BLCP1 styrene-acrylic emulsion polymer composition (40.0% NV, prepared as described in Table B, below, for bonding layer coating polymer composition BLCP1) was added and mixed for 10 minutes. After the 10 minute mixing period, 31.5 gms ASR B-33 (25.4% NV, see Table C, below) styrene-acrylic acid alkali soluble resin ammonium salt in water solution from Sealed Air (Diversey Division), Sturtevant, Wis., was added and mixed for 15 minutes. After the 15 minute mixing period, 1.28 gms zinc ammonium carbonate solution (a 15 wt % solution of zinc oxide in water obtained from Hydrite Chemical of Milwaukee, Wis.) was added uniformly over a period of 15 minutes, following which the contents were mixed for an additional 60 minutes. The resulting bonding layer coating composition 3 (i.e., BLC3) had a non-volatiles (NV) content of 21.9%.

Table B, below, provides the bonding layer coating styrene-acrylic emulsion polymer compositions (BLCP1 and BLCP2) utilized in BLC1 through BLC 4, as follows:

TABLE B

Bonding Layer Coating Styrene-Acrylic Emulsion Polymer Compositions (BLCP1 & BLCP2)

| Ingredient | BLCP1 | BLCP2 |
|---|---|---|
| Deionized Water (DI) | 320.5 | 645.1 |
| JONCRYL B-98 ASR (28%) | 371.0 | 0.0 |
| RHODAFAC RS-410 | 0.0 | 11.7 |
| TERGITOL ™ 15-S-3 | 0.0 | 2.5 |
| $NH_4OH$ (28%) | 7.4 | 1.5 |
| NaOH (50%) | 0.0 | 2.7 |
| APS | 2.5 | 2.3 |
| Styrene (Sty) | 47.4 | 143.7 |
| 2-Ethylhexyl Acrylate (2-EHA) | 192.4 | 0.0 |
| Butyl Acrylate (BA) | 0.0 | 90.2 |
| Methyl Methacrylate (MMA) | 47.4 | 0.0 |
| Methacrylic Acid (MAA) | 0.0 | 100.3 |
| Trimethylolpropane Triacrylate (TMPTA) | 8.9 | 0.0 |
| TBHP (70%) | 1.0 | 0.0 |
| NaE (97%) | 1.5 | 0.0 |
| Total Ingredients | 1000.0 | 1000.0 |
| Polymer % NV | 40.0 | 35.0 |
| Polymerized Monomer Theoretical Glass Transition Temperature ($T_g$ in ° C.) | −23° C. | 60° C. |

TABLE C

Styrene-Acrylic Acid Akali Soluble Resin (ASR) Compositions

| Styrene-Acrylic Acid Alkali Soluble Resin Ammonium Salt in Water | % non-volatiles (NV) | ASR % NV | % $NH_4OH$ (28%) | % KP-140 | % ZnO | ASR wt. avg MW | ASR Acid No. | ASR $T_g$ (° C.) |
|---|---|---|---|---|---|---|---|---|
| ASR B-33 | 25.4 | 19.6 | 6.5 | 4.4 | 1.4 | 5800 | 217 | 123 |
| JONCRYL B-98 ASR | 28.0 | 28.0 | 6.5 | 0.0 | 0.0 | 8500 | 205 | 123 |

JONCRYL B-98 ASR styrene-acrylic acid alkali soluble resin was a 28% dry weight styrene-acrylic acid resin ammonium salt aqueous solution from BASF, Wyandotte, MI.
ASR B-33 styrene-acrylic acid alkali soluble resin was a 19.6% dry weight styrene-acrylic acid resin ammonium salt aqueous solution from Sealed Air (Diversey Division), Sturtevant, WI.
Ammonium hydroxide in the form of a 28 wt % solution of ammonia in water, from Sigma-Aldrich of St. Louis, MO.
KP-140 was tributoxyethyl phosphate, from Chemtura of Middlebury, CT.
ZnO was zinc oxide hydrate 97%, from Sigma-Aldrich of St. Louis, MO Preparation of Bonding Layer Coating Emulsion Polymer Composition BLCP1 Used in BLC1, BLC2, and BLC3

A 2-liter, four-necked round bottom flask was equipped with: a heating/cooling system means to control and change temperature, a cold water condenser, a variable rate anchor paddle for agitation, and mechanical pumps as a means for metering in monomers. The flask was charged with: 227.5 grams deionized water, 371.0 grams of JONCRYL B-98 ASR styrene-acrylic acid alkali soluble resin (28 wt % dry weight styrene-acrylic acid resin ammonium salt aqueous solution from BASF, Wyandotte, Mich.), and 7.4 grams ammonium hydroxide in the form of 28 wt % solution of ammonia in water, from Sigma-Aldrich of St. Louis, Mo. These contents were mixed at 180 rpm and heated to 85° C. Upon reaching 85° C., 2.5 grams of ammonium persulfate dissolved in 15.0 grams DI water were added to the flask contents and the mixture was heated to 85° C. for 3 minutes. The internal contents temperature of 85° C. was maintained throughout the polymerization reaction procedure by means of the heating/cooling system. After the 3 minute hold period, the free radical emulsion polymerization process was initiated by feeding into the flask contents a homogeneous mixture of monomers including 47.4 grams styrene obtained from Sigma-Aldrich of St. Louis, Mo., 47.4 grams methyl methacrylate (MMA), also obtained from Sigma-Aldrich, 192.4 grams 2-ethylhexyl acrylate, also obtained from Sigma-Aldrich, and 8.9 grams trimethylolpropane triacrylate, also obtained from Sigma-Aldrich. The mixture of monomers was fed into the flask uniformly over a period of 75 minutes.

When the monomer feed was completed, the monomer feed lines and pump were flushed into the flask with 44.0 grams of DI water, and 1.0 gram of 70 wt % tertiarybutyl hydroperoxide (TBHP) in water, was dissolved in 12 grams of DI water, and was thereafter added to the contents and held at 85° C. for 15 minutes. After the 15 minute hold period, 1.5 grams sodium erythorbate monohydrate (97%, obtained from Sigma-Aldrich) was dissolved in 22.0 grams DI water was added to the flask contents over a period of 5 minutes, and the contents were held 30 additional minutes at 85° C. to complete the polymerization process. After the 30 minute heating period, the flask contents were cooled to room temperature and the emulsion polymer physical properties were evaluated.

The resulting bonding layer coating emulsion polymer BLCP1 had the following measured physical properties: percent non-volatiles: 40.0% (2 g/145° C./30 minutes); pH: 8.5; Brookfield viscosity: 19 centipoise (LVF 60 rpm/spindle 41 at 25° C.); particle size: 62 nm (Brookhaven BI-90 PS analyzer); % coagulum: 0.023% (325 mesh screen); acid number: 53.3 mg KOH/dry g polymer, via colorimetric titration method); residual monomer: 133 ppm 2-EHA by gas chromatography (5 ppm detectable limit).

Preparation of Bonding Layer Coating Emulsion Polymer Composition BLCP2 Used in BLC4

A 2-liter, four-necked round bottom flask was equipped with: a heating/cooling system means to control and change temperature, a cold water condenser, a variable rate anchor paddle for agitation, and mechanical pumps as a means for metering in monomers. The flask was charged with: 574.1 gms deionized water, 11.7 grams of RHODAFAC RS-410 ethoxylated tridecyl alcohol (3 moles ethylene oxide, 100% NV) organophosphate surfactant from Rhodia Inc., of Cranbury, N.J.; 2.5 gms TERGITOL™ 15-S-3 secondary alcohol ethoxylate nonionic surfactant, 100% NV, from Dow; 2.7 gms of a 50 wt % sodium hydroxide aqueous solution, from Sigma-Aldrich.

These contents were mixed at 180 rpm and heated to 85° C. Upon reaching 85° C., 2.3 gms of ammonium persulfate (from Sigma-Aldrich) was dissolved in 12.0 gms DI water and added to the flask contents, and the mixture was heated to 85° C. for 3 minutes. The internal contents temperature of 85° C. was maintained throughout the polymerization reaction procedure by means of the heating/cooling system. After the 3 minute hold period, the free radical emulsion polymerization process was initiated by feeding into the flask contents a homogeneous mixture of monomers including: 143.7 gms styrene from Sigma-Aldrich; 90.2 gms butyl acrylate, from Sigma-Aldrich, and 100.3 gms methacrylic acid, also from Sigma-Aldrich. The feeding was conducted uniformly over a period of 75 minutes. When the monomer feed was completed, the monomer feed lines and pump were flushed into the flask with 44 gms DI water and the contents were maintained at 85° C. for 90 minutes to complete the polymerization process. After the 90 minute heating period, the flask contents were cooled to 40° C., and 1.5 gms of ammonium hydroxide ($NH_4OH$) in the form of a 28 wt % ammonia in water, from Sigma-Aldrich, dissolved in 15 grams DI water, was added to the flask contents over a period of 5 minutes. When the final emulsion polymer was completely cooled to room temperature, the emulsion polymer physical properties were evaluated.

The resulting bonding layer coating emulsion polymer BLCP2 had the following measured physical properties: 35.0% non-volatiles (2 g/145° C./30 minutes); pH: 5.6; Brookfield viscosity: 29 centipoise (LVF 60 rpm/spindle 41 at 25° C.); particle size: 65 nm (Brookhaven BI-90 PS Analyzer); percent coagulum: 0.017% (325 mesh screen); acid number: 190.3 mg KOH/dry g polymer (colorimetric titration method); residual monomer: 123 ppm BA by gas chromatography (5 ppm detectable limit).

Strength and Flexibility Layer Coating Compositions SFLC1 Through SFLC7

Strength and flexibility layer coating compositions 1 through 7 (SFLC1-SFLC7) were prepared using the ingredient addition order described in Table D below. SFLC1-SFLC7 compositions varied in ingredient type and level.

SFLC2 through SFLC7 were prepared in accordance with the procedure below for the preparation of SFLC1, with the following exceptions: SFLC3-SFLC7 did not contain any neat UROTUF L522-W-40 polyurethane dispersion and SFLC3-SFLC7 contained SFLCP polyurethane-acrylic hybrid emulsion ingredients as set forth in Table E. SFLC3-SFLC7 contained, respectively, strength and flexibility layer coating composition polymers 1 through 5 (i.e., SFLCP1-SFLCP5), i.e., a polyurethane-acrylic hybrid (L522 PU-PMMA) emulsion polymer, as identified in Table E, below.

TABLE D

Strength and Flexibility Layer Coating Compositions (SFLC1-SFLC7)

| Ingredient | Order of Addition | SFLC1 | SFLC2 | SFLC3 | SFLC4 | SFLC5 | SFLC6 | SFLC7 |
|---|---|---|---|---|---|---|---|---|
| DI Water | 1 | 35.07 | 19.48 | 9.83 | 9.83 | 9.83 | 9.83 | 9.83 |
| CARBITOL ® DE | 2 | 4.15 | 5.65 | 5.65 | 5.65 | 5.65 | 5.65 | 5.65 |
| KP-140 | 3 | 1.97 | 0.7 | 0.7 | 0.7 | 0.7 | 0.7 | 0.7 |
| CAPSTONE ® FS-60 (40%) | 4 | 0.02 | 0.01 | 0.01 | 0.01 | 0.01 | 0.01 | 0.01 |
| BYK-024 (96%) | 5 | 0.0 | 0.01 | 0.01 | 0.01 | 0.01 | 0.01 | 0.01 |
| AC-316 wax emulsion (35%) | 6 | 9.65 | 6.65 | 6.65 | 6.65 | 6.65 | 6.65 | 6.65 |
| UROTUF ® L522-W-40 (40%) | 7 | 49.14 | 67.5 | 0.0 | 0.0 | 0.0 | 0.0 | 0.0 |
| SFLCP1 (35%) | 8 | 0.0 | 0.0 | 77.15 | 0.0 | 0.0 | 0.0 | 0.0 |
| SFLCP2 (35%) | 8 | 0.0 | 0.0 | 0.0 | 77.15 | 0.0 | 0.0 | 0.0 |
| SFLCP3 (35%) | 8 | 0.0 | 0.0 | 0.0 | 0.0 | 77.15 | 0.0 | 0.0 |
| SFLCP4 (35%) | 8 | 0.0 | 0.0 | 0.0 | 0.0 | 0.0 | 77.15 | 0.0 |
| SFLCP5 (35%) | 8 | 0.0 | 0.0 | 0.0 | 0.0 | 0.0 | 0.0 | 77.15 |
| Total Ingredients | | 100.00 | 100.00 | 100.00 | 100.00 | 100.00 | 100.00 | 100.00 |
| Coating % NV | | 25.0% | 30.0% | 30.0% | 30.0% | 30.0% | 30.0% | 30.0% |

BYK-024 polysiloxane defoamer (96% NV, BYK-Chemie USA, Wallingford, CT)
SFLCP1-5 polyurethane-acrylic hybrid emulsion polymer compositions are defined in Table E.

TABLE E

Strength and Flexibility Layer Coating Polyurethane-Acrylic Hybrid Emulsion Polymer Compositions SFLCP1 through SFLCP5

| Ingredient | SFLCP1 | SFLCP2 | SFLCP3 | SFLCP4 | SFLCP5 |
|---|---|---|---|---|---|
| UROTUF ® L522-W-40 (40%) | 1005.0 | 1170.0 | 1335.0 | 1417.5 | 1335.0 |
| Deionized Water (DI) | 509.4 | 411.6 | 313.58 | 263.31 | 313.58 |
| NH$_4$OH (28%) | 1.8 | 1.46 | 1.46 | 1.46 | 1.46 |
| Methyl methacrylate (MMA) | 198.0 | 132.0 | 66.0 | 33.0 | 33.0 |
| SILQUEST ® A-174 Silane (TMSMMA) | 0.0 | 0.0 | 0.0 | 0.0 | 33.0 |
| APS | 0.8 | 0.53 | 0.53 | 0.53 | 0.53 |
| NaE (97%) | 0.27 | 0.18 | 0.0 | 0.0 | 0.0 |
| Total Ingredients | 1715.27 | 1715.77 | 1716.57 | 1715.80 | 1716.57 |
| Monomer Initiation Temperature (° C.) | 60° C. | 60° C. | 80° C. | 80° C. | 80° C. |
| % Polymer NV | 35.0% | 35.0% | 35.0% | 35.0% | 35.0% |
| % Dry Weight L522 PU | 67% | 78% | 89% | 94.5% | 89% |
| % Dry Weight Polymerized Acrylic Monomer | 33% | 22% | 11% | 5.5% | 11% |

UROTUF ® L522-W-40 had a DSC measured $T_g$ of −45 °C.
Poly(methylmethacrylate) had a theoretical and measured DSC $T_g$ of 105° C.
SILQUEST ® A-174 trimethoxysilane methylmethacrylate, was obtained from Momentive Performance Materials, Waterford, NY.

Procedure for the Preparation of SFLC1

To a 250 mL beaker equipped with agitation means comprising a magnetic stir plate and a 1.5 inch TEFLON®-coated magnetic stir bar, were charged in the following order: (i) 35.07 gms deionized water (DI) agitated at about 150 rpm, (ii) 4.15 gms CARBITOL DE® diethylene glycol monoethyl ether, from Dow, (iii) 1.97 gms KP-140 tributoxyethyl phosphate, from Chemtura, of Middlebury, Conn., (iv) 0.02 gm CAPSTONE® FS-60 wetting and leveling agent containing 40% active fluorochemical, from DuPont, (v) 9.65 gms AC-316 wax emulsion (35% NV, prepared from ingredients as described in Table F, below, for wax emulsion compositions). The ingredients in the beaker were mixed for 5 minutes. After the 5 minute mixing period, 49.14 gms UROTUF® L522-W-40 aliphatic polyurethane dispersion obtained from Reichhold of Durham, N.C., having 40% non-volatiles and a $T_g$ of −45° C., was added to the beaker and mixed for an additional 60 minutes. The resulting Strength and Flexibility Layer Coating Composition SFLC1 had a non-volatiles content of 25.0%.

TABLE F

Wax Emulsion Compositions

| Ingredient | AC-316 Wax Emulsion | EPOLENE ® E-43 Wax Emulsion |
|---|---|---|
| De-ionized Water (DI) | 64.358 | 57.384 |
| AC-316 Wax | 27.51 | 0.0 |
| EPOLENE ® E-43 Wax | 0.0 | 29.149 |
| TOMADOL ® 25-9 Surfactant | 6.8 | 8.712 |
| Caustic Potash (45%) | 0.874 | 4.755 |
| Sodium Bisulfite (38%) | 0.778 | 0.0 |
| Total Ingredients | 100.000 | 100.000 |
| % NV Wax Emulsion | 35.0% | 40.0% |

AC-316 Wax, oxidized high density polyethylene with an acid number of about 16, obtained from Honeywell International Inc., Morristown, NJ
EPOLENE ® E-43 wax, maleated polypropylene with an acid number of about 45, obtained from Westlake Chemical, Houston, TX.
TOMADOL ® 25-9 Surfactant, $C_{12-15}$ Ethoxylated Alcohol, obtained from Air Products & Chemicals, Allentown, PA.
Caustic Potash (45%), 45% KOH in water solution, obtained from Oxychem, Dallas, TX.
Sodium Bisulfite (38%), 38% Sodium Bisulfite in water solution, obtained from Hydrite Chemical, Milwaukee, WI.

Procedure for Preparation of Polyurethane-Acrylic Hybrid Emulsion Polymer Composition for SFLCP1

A 5-liter, four-necked round bottom flask was equipped with: a heating/cooling system means to control and change temperature, a cold water condenser, and a variable rate anchor paddle for agitation. The flask was charged with: 1005.0 g of UROTUF® L522-W-40 aliphatic Polyurethane Dispersion (40% NV, $T_g$–45° C.) from Reichhold of Durham, N.C., and the contents were mixed at 180 revolutions per minute (rpm) at room temperature (22° C.). To the flask were added 460 grams of DI water, 0.8 gram ammonium hydroxide in the form of a 28 wt ammonia in water, from Sigma-Aldrich, St. Louis, Mo.), and 198.0 grams methyl methacrylate monomer (MMA), also from Sigma-Aldrich. The contents were mixed for an additional 5 minutes after addition of the methyl methacrylate monomer.

The contents were heated to 60° C. and held at 60° C. for 40 minutes to allow the MMA monomer to swell and equilibrate within the UROTUF® L522-W-40 PU dispersion particles. After equilibration, a mixture of 0.8 gram ammonium persulfate (from Sigma-Aldrich) dissolved in 44.0 g DI water and 1.0 g ammonium hydroxide solution ($NH_4OH$, 28 wt % water solution of ammonia, Sigma-Aldrich, St. Louis, Mo.) was added to the flask contents and the mixture was held at 60° C. for 5 minutes.

After the 5 minute hold period, the free radical emulsion polymerization process was initiated by adding to the flask contents a mixture of 0.27 gram sodium erythorbate monohydrate (NaE, purity 97%, from Sigma-Aldrich) dissolved in 5.4 gram DI water. The MMA monomer polymerization began within 1 minute after the addition of the NaE solution and MMA monomer polymerization exothermically reacted causing the contents temperature to rise to 75° C. The contents were then heated to 80° C. and held at 80° C. for 90 minutes to complete the polymerization process. After the 90 minute heating period, the flask contents were completely cooled to room temperature and the Polyurethane-Acrylic Hybrid emulsion polymer physical properties were evaluated.

The resulting strength and flexibility layer coating Polyurethane-Acrylic Hybrid emulsion polymer SFLCP1 had the following measured physical properties: Percent Non-Volatiles: 35.0% (2 g/145° C./30 minutes); pH: 7.9; Brookfield Viscosity: 13 centipoise (LVF 60 rpm/spindle 41 at 25° C.); Percent Coagulum: 0.021% (325 mesh screen); Residual Monomer: 113 ppm methyl methacrylate by gas chromatography (5 ppm detectable limit).

Wear Layer Coating Compositions WLC1 and WLC2

Wear Layer Coating Compositions WLC1 and WLC2 were prepared using the ingredient addition order described in Table G, below. WLC1 and WLC2 varied in ingredient type and level. Wear layer coating composition WLC2 was prepared identically to the procedure set forth below for the preparation of WLC1, with the following exceptions: WLC2 did not contain any WACKER® HC 130 or PICASSIAN® XL-732 ingredients, but WLC2 did contain DSM Crosslinker CXL-1 and DOWANOL dipropylene glycol n-butyl ether.

TABLE G

Wear Layer Coating Compositions WLC1 and WLC2

| Ingredient | Order of Addition | WLC1 | WLC2 |
|---|---|---|---|
| DI Water | 1 | 34.87 | 22.74 |
| HYDRIBUR ® 878 (40%) | 2 | 23.00 | 29.61 |
| NEOREZ ® 1073 (35%) | 3 | 8.01 | 10.34 |
| CARBITOL ® DE | 4 | 7.38 | 5.64 |
| DOWANOL ® DPnB | 5 | 0.0 | 2.26 |
| BYK ®-024 (96%) | 6 | 0.01 | 0.0094 |
| CAPSTONE ® FS-60 (40%) | 7 | 0.03 | 0.0282 |
| AC-316 wax emulsion (35%) | 8 | 3.52 | 3.76 |
| EPOLENE ® E-43 (40%) wax emulsion | 9 | 0.88 | 0.94 |
| ASR B-33 (25.4) | 10 | 14.00 | 15.04 |
| WACKER ® HC 130 (60%) | 11 | 1.1 | 0.0 |
| PICASSIAN ® XL-732 (40%) | 12 | 7.2 | 0.0 |
| DSM Crosslinker CXL-1 (40%) | 13 | 0.0 | 6.0 |
| Total Ingredients | | 100.00 | 100.0000 |
| Coating % NV | | 20.7% | 23.4% |

DSM Crosslinker CXL-1 multifunctional polycarbodiimide, 40% NV, obtained from DSM Coating Resins, Wilmington, MA
DOWANOL DPnB dipropylene glycol n-butyl ether, obtained from Dow of Midland, MI

Procedure for the Preparation of Wear Layer Coating Composition 1 (WLC1)

To a 250 mL beaker equipped with agitation means comprising a magnetic stir plate and a 1.5 inch TEFLON®-coated magnetic stir bar were charged, in the following order: (i) 34.87 gms deionized water (DI), stirred at about 150 rpm, (ii) 23.0 gms HYDRIBUR® 878 aliphatic polyurethane-acrylic hybrid dispersion, 40% NV, from Air Products, Allentown, Pa., (iii) 8.01 gms NEOREZ® 1073 aliphatic polyurethane dispersion, 35% NV, from DSM Coating Resins, Wilmington, Mass., (iv) 7.38 grams CARBITOL® DE diethylene glycol monoethyl ether, (v) 0.01 gm BYK®-024 polysiloxane defoamer, 96% NV, from BYK-Chemie USA of Wallingford, Conn., (vi) 0.03 gram CAPSTONE® FS-60 wetting and leveling agent, 40% active fluorochemical, from DuPont, (vii) 3.52 grams AC-316 wax emulsion (35% NV, prepared from ingredients as described in Table F, above, for wax emulsion compositions). (viii) 0.88 gm of an EPOLENE® E-43 wax emulsion (40% NV, prepared from ingredients as described in Table F, above, for wax emulsion compositions), (ix) 14.0 grams ASR B-33 (25.4% NV) styrene-acrylic acid alkali soluble resin, a 19.6% dry weight styrene acrylic acid resin ammonium salt aqueous solution from Sealed Air (Diversey Division), Sturtevant, Wis., (x) 1.1 gms WACKER® HC 130 silicone emulsion, 60% NV, obtained from Wacker Chemical Corp. of Adrian, Mich. The ingredients in the beaker were mixed for 30 minutes. After the 30 minute mixing period, 7.2 gms PICASSIN® XL-732 multifunctional polycarbodiimide, 40% NV, obtained from Picassian Polymers of Peabody, Mass., was added and mixed for an additional 60 minutes. The resulting wear layer coating composition 1 (WLC1) had a non-volatiles content of 20.7%.

Wear Layer Coating Composition 3 (WLC3)

Wear Layer Coating Composition 3 (WLC3) was prepared using the ingredient addition order described in Table H, below.

TABLE H

Wear Layer Coating Composition 3 (WLC3)

| Ingredient | Order of Addition | WLC3 |
| --- | --- | --- |
| SILRES ® BS66 (80%) | 1 | 56.9 |
| XIAMETER ® OFS-6011 | 2 | 28.08 |
| BYK-330 ® (51%) | 3 | 0.4 |
| METACURE ® T-12 Catalyst | 4 | 0.72 |
| XIAMETER ® OFS-6070 silane | 5 | 13.5 |
| Acetic Acid (Glacial) | 6 | 0.4 |
| Total Ingredients | | 100.00 |
| Coating % NV | | 73.0% |

WLC3 was prepared by charging a 250 mL beaker, equipped with agitation means comprising a magnetic stir plate and a 1.5 inch TEFLON®-coated magnetic stir bar and agitated at about 150 rpm, with the following ingredients in the following order: (i) 56.9 gms SILRES® BS66 isooctyl trimethoxysilane silicone resin in methanol, 80% NV, from Wacker Chemical of Adrian, Mich., (ii) 28.08 gms XIAMETER® OFS-6011 (Dow Z 6011) gamma-aminopropyl triethoxysilane, from Dow Corning of Midland, Mich., (iii) 0.4 gm BYK®-330 polyether modified polydimethylsiloxane wetting & leveling agent, 51% non-volatiles, from BYK-Chemie USA, (iv) 0.72 gm METACURE® T-12 dibutyl tin dilaurate catalyst, from Air Products & Chemicals of Allentown, Pa., (iv) 13.5 gms XIAMETER® OFS-6070 (Dow Z 6070) trimethoxy methylsilane, from Dow Corning, (v) 0.4 gm glacial acetic acid, from Sigma-Aldrich. The ingredients charged to the beaker were mixed for 60 minutes. The resulting wear layer coating composition WLC3 had a Non-Volatiles content of 73% NV.

Example No. 1

5-Cycle Peelable Coating System

A 5-cycle peelable coating system was prepared including one Bonding Layer prepared from BLC3, a total of twenty strength and flexibility layers each prepared from SFLC1, four intermediate wear layers prepared from WLC1, and one wear layer prepared from WLC3. The 5-cycle peelable coating system contained a total of 26 layers. Each of the five cycles contained four strength and flexibility layers and one wear layer. The coating system contained only one bonding layer. The wear layer coating composition (WLC3) was utilized only for the wear layer of the fifth cycle, which was the final cycle.

More particularly, bonding layer composition 3 (BLC3), prepared above, was applied directly to a stripped 30 square foot section (5 ft×6 ft) of vinyl composition tile floor comprising a total of thirty 12-inch by 12-inch Armstrong EXCELON black commercial-grade vinyl composition tiles obtained from Armstrong World Industries of Lancaster, Pa. The tiles were installed over a concrete floor, with mastic holding the tiles to the floor. The tiles were abutted against one another and each of the coating compositions (BLC3, SFLC1, WLC1, and WLC3) was applied in a manner such that the resulting coating spanned the joints between the tiles.

The sole layer of BLC 3 (21.9% NV) was applied over the 30 square feet of stripped VCT using a PROSPEED® Floor Finish Applicator System comprising a PROSPEED® TM/MC applicator and PROSPEED® rinseable flat mop applicator pad. The coating of BLC3 was applied to the VCT at a wet average deposition of 1500 ft$^2$/gal followed by a 45 minute dry period yielding an average dry polymer film coverage of about 0.004 g/in$^2$, which corresponds with an average bonding layer thickness of about 0.23 mils.

After the bonding layer coating composition dried producing the bonding layer, a first SFLC1 (25% NV) was applied over the dried bonding layer to form a first strength and flexibility layer. The strength and flexibility layer was applied using the same PROSPEED® Floor Finish Applicator System as for the application of the bonding layer. SFLC1 was applied at a wet average deposition of 1500 ft$^2$/gal followed by a 60 minute dry period, yielding an average dry polymer film coverage of about 0.0045 g/in$^2$, which corresponds with an average layer thickness of about 0.27 mils. After the first strength and flexibility layer dried, a second strength and flexibility layer was applied in the same manner, and it was then allowed to dry for 60 minutes, with the strength and flexibility layer also having an average thickness of about 0.27 mils. A third strength and flexibility layer was then applied over the second strength and flexibility layer, again in the same manner, and also allowed to dry for 60 minutes. Then a fourth strength and flexibility layer was applied over the third strength and flexibility layers, again in the same manner, again allowed to dry for 60 minutes. The resulting four strength and flexibility layers, taken together, provided an average dry polymer film coverage of about 0.018 g/in$^2$, which corresponds with an average layer thickness of about 1.1 mils.

Thereafter a first wear layer coating of WLC1 was applied over the fourth strength and flexibility layer. WLC1 was applied using the same PROSPEED® Floor Finish Applicator System as for the application of the bonding layer and the strength and flexibility layers. WLC1 (20.7% NV) was also applied at a wet average deposition of 1500 ft$^2$/gal followed by an 18 to 24 hour drying period, yielding an average dry polymer film coverage of about 0.0037 g/in$^2$, which corresponds with an average layer thickness of about 0.22 mil. The combination of the four strength and flexibility layers and the first wear layer thereover is defined as Application Cycle #1.

After the 18-24 hour drying period of Application Cycle #1, a fifth strength and flexibility layer coating was applied on top of the first wear layer. The fifth strength and flexibility layer was also applied at a wet average deposition of 1500 ft$^2$/gal followed by a 60 minute dry period yielding an average dry polymer film coverage of about 0.0045 g/in$^2$, corresponding with an average layer thickness of about 0.27 mil. The strength and flexibility coating was applied three more times in the same manner as described above to provide sixth, seventh, and eighth strength and flexibility layers, with the fifth through eighth strength and flexibility layers providing together providing an average dry polymer film coverage of about 0.018 g/in², which corresponds with an average layer thickness of about 1.1 mils. On top of the eighth dry strength and flexibility layer was applied a second wear layer coating of WLC1 again at a wet average deposition of 1500 ft²/gal, followed by an 18-24 hour dry period yielding an average dry polymer film coverage of about 0.0037 g/in² corresponding with an average layer thickness of about 0.22 mil.

The fifth through eighth strength and flexibility layers and the second wear layer are herein defined as Application Cycle #2. Application Cycle #2 was repeated 2 more times in the same manner as described in Application Cycle #2, bringing the total number of Application Cycles to 4, including a 1 bonding layer, a total of 16 strength and flexibility layers, and four wear layers. After the 18-24 hour drying period of Application Cycle #4, a seventeenth strength and flexibility layer coating was applied on top of the fourth Wear Layer, at a wet average deposition of 1500 ft²/gal followed by a 60 minute dry period yielding an average dry polymer film coverage of about 0.0045 g/in² corresponding with an average layer thickness of about 0.27 mil. This process was repeated three more times, in the same manner, to provide eighteenth, nineteenth, and twentieth strength and flexibility layers, with the seventeenth through twentieth strength and flexibility layers providing an average dry polymer film coverage of about 0.018 g/in², corresponding with an total average thickness of about 1.1 mils. On top of the dry twentieth strength and flexibility layer was applied one wear layer coating WLC3 (73% NV) at a wet average deposition of 1500 ft²/gal followed by an 18-24 hour dry period yielding an average dry polymer film coverage of about 0.0129 g/in², corresponding with an average thickness of 0.78 mil.

The completed 5-cycle peelable coating system of Example 1 consisted of 1 bonding layer, 20 strength and flexibility layers, and 5 wear layers. The 20 strength and flexibility layers provided a total thickness of about 5.5 mils. The wear layers provided a total thickness of about 1.7 mils.

Example 2

Example 2 was also a 5-cycle peelable coating system. Example 2 was prepared in the same manner in which Example 1 was prepared. However, whereas Example 1 utilized BLC3 as the bonding layer coating composition, Example 2 utilized BLC1 (21.7% NV) as the bonding layer coating composition.

Example 3

Example 3 was also a 5-cycle peelable coating system. Example 3 was prepared in the same manner in which Example 1 was prepared. However, whereas Example 1 utilized BLC3 as the bonding layer coating composition, Example 3 utilized BLC2 (20.0% NV) as the bonding layer coating composition.

Example No. 4

4-Cycle Peelable Coating System

Example 4 was carried out in the same manner as Example 1, except that only four cycles were applied. The bonding layer was applied to a stripped 30 ft² (5 ft×6 ft) VCT floor comprising thirty 12 inch by 12 inch Armstrong EXCELON® black commercial VCT (Armstrong World Industries, Lancaster, Pa. The bonding layer coating composition applied for the sole bonding layer was BLC3 (21.9% NV). The strength and flexibility layer coating composition used to make each of the sixteen strength and flexibility layers was SFLC1 (25% NV). The wear layer coating composition applied in the first three cycles was WLC1 (20.7% NV). The wear layer coating composition applied in the fourth and final cycle was WLC3 (73% NV). Each of the coating compositions was applied using the PROSPEED® Floor Finish Applicator System in the same manner as described in Example 1.

The sole bonding layer was formed by the application of BLC3 was at a wet average deposition of 1500 ft²/gal. The applied coating was allowed to dry for 45 minutes, with the resulting bonding layer having an average dry polymer film coverage of about 0.004 g/in², corresponding with an average layer thickness of about 0.23 mil.

Each of the sixteen strength and flexibility layers was formed by the application of SFLC1 at a wet average deposition of 1500 ft²/gal. For each of the sixteen layers, the applied coating composition was allowed to dry for 60 minutes, with each of the resulting strength and flexibility layers having an average dry polymer film coverage of about 0.0045 g/in², corresponding with an average layer thickness of about 0.27 mil. The four strength and flexibility layers of each cycle together provided a total average dry polymer film coverage of about 0.018n g/in², corresponding with an average total thickness of about 1.1 mils per cycle.

Each of the wear layers for the first three cycles was formed by the application of WLC1 at a wet average deposition of 1500 ft²/gal. For each of these wear layers, the applied coating composition was allowed to dry for an 18 to 24 hour period. Each resulting wear layer had an average dry polymer film coverage of about 0.0037 g/in², corresponding with an average layer thickness of about 0.22 mil.

The final wear layer on the fourth and final cycle was formed by the application of WLC3 at a wet average deposition of 1500 ft²/gal. The final wear layer was allowed to dry for an 18 to 24 hour period. The final wear layer had an average dry polymer film coverage of about 0.0129 g/in², corresponding with an average layer thickness of about 0.78 mil.

The resulting 4-cycle peelable coating system consisted of 1 bonding layer, 16 strength and flexibility layers, and 4 wear layers yielding a completed 4 cycle peelable coating structure.

Example 5

Example 5 was also a 4-cycle peelable coating system. Example 5 was prepared in the same manner in which Example 4 was prepared. However, whereas Example 4 utilized BLC3 as the bonding layer coating composition, Example 5 utilized BLC1 (21.7% NV) as the bonding layer coating composition.

Example 6

Example 6 was also a 4-cycle peelable coating system. Example 6 was prepared in the same manner in which Example 4 was prepared. However, whereas Example 4 utilized BLC3 as the bonding layer coating composition, Example 6 utilized BLC2 (20.0% NV) as the bonding layer coating composition.

Example No. 7

3-Cycle Peelable Coating System

Example 7 was carried out in the same manner as Example 1, except that only three cycles were applied. The bonding layer was applied to a stripped 30 ft² (5 ft×6 ft) VCT floor comprising thirty 12 inch by 12 inch Armstrong EXCELON® black commercial VCT (Armstrong World Industries, Lancaster, Pa. The bonding layer coating composition applied for the sole bonding layer was BLC3 (21.9% NV). The strength and flexibility layer coating composition used to make each of the twelve strength and flexibility layers was SFLC1 (25% NV). The wear layer coating composition applied in the first two cycles was WLC1 (20.7% NV). The wear layer coating composition applied in the third and final cycle was WLC3 (73% NV). Each of the coating compositions was applied using the Prospeed Floor Finish Applicator System in the same manner as described in Example 1.

The sole bonding layer was formed by the application of BLC3 was at a wet average deposition of 1500 ft²/gal. The applied coating was allowed to dry for 45 minutes, with the resulting bonding layer having an average dry polymer film coverage of about 0.004 g/in², corresponding with an average layer thickness of about 0.23 mil.

Each of the twelve strength and flexibility layers was formed by the application of SFLC1 at a wet average deposition of 1500 ft²/gal. For each of the twelve layers, the applied coating composition was allowed to dry for 60 minutes, with each of the resulting strength and flexibility layers having an average dry polymer film coverage of about 0.0045 g/in², corresponding with an average layer thickness of about 0.27 mil. The four strength and flexibility layers of each cycle together provided a total average dry polymer film coverage of about 0.0181 g/in², corresponding with an average total thickness of about 1.1 mils per cycle.

Each of the wear layers for the first two cycles was formed by the application of WLC1 at a wet average deposition of 1500 ft²/gal. For each of these wear layers, the applied coating composition was allowed to dry for an 18 to 24 hour period. Each resulting wear layer had an average dry polymer film coverage of about 0.0037 g/in², corresponding with an average layer thickness of about 0.22 mil.

The final wear layer on the third and final cycle was formed by the application of WLC3 at a wet average deposition of 1500 ft²/gal. The final wear layer was allowed to dry for an 18 to 24 hour period. The final wear layer had an average dry polymer film coverage of about 0.0129 g/in², corresponding with an average layer thickness of about 0.78 mil.

The resulting 3-cycle peelable coating system consisted of 1 bonding layer, 12 strength and flexibility layers, and 3 wear layers yielding a completed 3-cycle peelable coating structure.

Example 8

Example 8 was also a 3-cycle peelable coating system. Example 8 was prepared in the same manner in which Example 7 was prepared. However, whereas Example 7 utilized BLC3 as the bonding layer coating composition, Example 8 utilized BLC1 (21.7% NV) as the bonding layer coating composition.

Example 9

Example 9 was also a 3-cycle peelable coating system. Example 9 was prepared in the same manner in which Example 7 was prepared. However, whereas Example 7 utilized BLC3 as the bonding layer coating composition, Example 9 utilized BLC2 (20.0% NV) as the bonding layer coating composition.

Peel Evaluation Testing

The multi-cycle peelable coating system of each of Examples 1-9 was evaluated for manual peel performance from the vinyl composition tile floor described in Example 1. Seventeen days after the last wear layer was laid down on the floor, the perimeter of each of the 30 ft² (i.e., 5 ft×6 ft) vinyl composition tile floor sections comprising thirty 12 inch by 12 inch Armstrong EXCELON® black commercial tiles having the multi-cycle multilayer peelable coating system of Examples 1-9 was scored with a #9 single edge razor blade, cutting completely through the peelable coating structure. The razor blade was manually used to start the peel of each of the floor coatings of Examples 1-9. For the coating of each example, a "starter strip" of peeled coating was prepared along one of the 5-foot length of one edge of the perimeter of the coating. The starter strip was prepared by using the razor blade to separate the coating from the tile to the extent that the separated coating could be grasped by the fingers and peeled back carefully (taking care not to tear the coating), to expose approximately 8 inches of the first tile row, i.e., separating an approximately 8-inch wide started strip of the coating over the 5-foot length.

After the starter strip was obtained, the peelability of the coating was evaluated by having two individuals hand grasp the starter strip equidistantly along the length of the 5-foot long, 8-inch wide starter strip. The individuals manually pulled the coating back and away from the 8 inch×5 ft peeled section of flooring toward the unpeeled flooring section at an peel angle about 45 degrees, i.e., bending the starter strip and the peeled portion of the coating back approximately 135 degrees from its original position. The two individuals grasping the starter strip carried out the manual peeling at a rate of about 0.5 linear feet (0.5 ft×5 ft) of peel per second.

Criteria for Evaluation of Peel Performance

Evaluation of the peelability of the multi-cycle floor coating systems of Examples 1-9 was assessed using the following measurements related to peel performance: (1) the number of film tears upon preparation of the 8 inch×5 ft starter strip (zero tears is the most desirable); (2) whether the film peeled the full distance, and if not the number of linear feet of peel from the floor before the film tore off without further peeling (the full length of 6 feet being the most desirable); (3) the surface area peeled upon film tear (30 square feet being the most desirable); (4) the percent of the coating that peeled without film tear (100% being the most desirable); (5) the percent of the coating which peeled from the 30 square feet.

Qualitative characterizing data was also taken for the peel force required, i.e., peel resistance. This assessment was made by the two individuals conducting the manual peeling. Qualitative characterization of the post-peel appearance of the surface of the substrate was also taken. For those substrates having a uniform post-peel appearance, it was believed that the bonding layer remained with the substrate. For those substrates which had a non-uniform post-peel appearance, it was believed that the portions of the bonding layer remained on the substrate, and portions of the bonding layer peeled off with the remainder of the coating.

Peel Performance Data: Conclusions

Table H, below, provides peel performance data for the peelable coating systems of Examples 1-9. Examples 1-3, which had 5-cycle coatings, exhibited the most complete peeling with no tears in the starter strip. All three of the 5-cycle coating systems peeled completely, i.e., 100% of the 30 square foot area, including across the joints between the vinyl composition tiles. In Example 3, the substrate exhibited a non-uniform, which may have been caused by the high peel resistance generated by BLC2 used in Examples 3, 6, and 9.

Examples 4-6, which had 4-cycle coatings, varied in peel performance. The peel level of Example 4 (100% peeled) was superior to the peel level of Example 5 (90% peeled), which in turn was superior to the peel level of Example 6 (50% peeled). Based on the totality of the data, the high peel force of BLC2 in Example 6 appears to be associated with the greater tearing of the Example 6 coating during peeling, resulting in the 50% peel level. Differences between the coating of Example 4 and the coating of Example 5 included different bonding layers (BLC3 for Example 4 and BLC1 for Example 5), as well as a difference in post-peel average total coating thickness (4.44 mils for Example 4 and 3.85 mils for Example 5.

Examples 7-9, which had 3-cycle coatings, had the thinnest coatings and exhibited the lowest peel levels: from about 5% (Example 9) to about 33% (Examples 7 and 8). As the same bonding layers were used on Examples 7-9 as for Examples 1-3 and 4-6, respectively, it appears that the lower peel level results for Examples 7-9 are related to the lower average total thickness of the coatings of Examples 7-9 versus the average total thickness of the coatings of Examples 1-6.

As noted above relative to peel level, the multi-cycle floor coating systems of Examples 1-4 were peeled off of the substrate without tearing, i.e., they peeled off in a single piece. Hence, in Table I the percent which peeled is 100%. However, the multi-cycle coating systems of Examples 5-9 did not peel off of the substrate without tearing and leaving a portion of the coating remaining on the floor. A detailed examination of the manner in which the multi-cycle coatings of Examples 5-9 tore revealed that the tearing was closely associated with peeling across a joint between tiles. That is, tearing was usually initiated as the coating was being peeled across or along a joint between tiles. Two possible reasons for tear initiation at the joints include: (i) that the coating has a stronger bond to the substrate in the area of the joint due to increased surface area and/or mechanical interlocking of the coating in the joint, and (ii) that the coating is weaker in the area of the joint because the coating can penetrate into the joint and dries thinner than the coating in the areas away from the joints.

TABLE I

Examples 1-9: Peel Performance Results

| Ex # | # Cycles | Break Force Max Load (gm-Force) | Elongation (%) | Post-Peel Avg. Total Thickness (mils) | (BF) × (% E) × (mils) ×10⁶ | Calculated Total Rubber (mils) | Max peak load tear force (gm-Force) | % peel | # Tears in Starter Strip | Linear Feet Peel before Film Tore | Peeled Area (ft²) | Peel Resistance | Post-Peel Appearance of Substrate |
|---|---|---|---|---|---|---|---|---|---|---|---|---|---|
| 1 | 5 | 3931 | 405 | 5.88 | 9.36 | 4.40 | 522 | 100 | 0 | 6 | 30 | Moderate | Uniform |
| 2 | 5 | 3751 | 418 | 5.57 | 8.73 | 4.40 | 557 | 100 | 0 | 6 | 30 | Moderate | Uniform |
| 3 | 5 | 4085 | 410 | 5.79 | 9.70 | 4.40 | 460 | 100 | 0 | 6 | 30 | Strong | Splotchy |
| 4 | 4 | 3430 | 394 | 4.44 | 6.00 | 3.52 | 345 | 100 | 0 | 6 | 30 | Moderate | Uniform |
| 5 | 4 | 2845 | 349 | 3.85 | 3.82 | 3.52 | 344 | 90 | 1 | 5 | 27 | Moderate | Uniform |
| 6 | 4 | 2909 | 378 | 4.59 | 5.05 | 3.52 | 372 | 50 | 1 | 3 | 15 | Strong | Splotchy |
| 7 | 3 | 2838 | 394 | 3.39 | 3.79 | 2.64 | 398 | 33 | 1 | 2 | 10 | Moderate | Uniform |
| 8 | 3 | 1939 | 249 | 2.94 | 1.42 | 2.64 | 227 | 33 | 2 | 2 | 10 | Moderate | Uniform |
| 9 | 3 | 1931 | 347 | 3.37 | 2.26 | 2.64 | 165 | <5 | 10 | <1 | 1.7 | Strong | Splotchy |

Example No. 10

4-Cycle Peelable Coating System to a 12"×12" Vinyl Composition Tile

All bonding layer, strength and flexibility layer, and wear layer coatings were applied to vinyl composition tile ("VCT") substrate as described below. To a stripped 12 inch by 12 inch Armstrong EXCELON commercial VCT were applied, using a 2"×2" Kendall CURITY™ gauze sponge USP type VII gauze (Tyco Healthcare, Mansfield, Mass.), the coating compositions identified below were applied and dried in the preparation of a 4-cycle peelable coating system to the 12"×12" vinyl composition tile.

Bonding layer coating composition 4 (BLC4, 20% NV) was applied to the VCT at a wet average deposition of 3 ml/ft², followed by a 45 minute dry period. The resulting bonding layer had an average dry polymer film coverage of about 0.0044 g/in², which corresponded with an average layer thickness of about 0.21 mil.

On top of the dry bonding layer, strength and flexibility layer coating composition 2 (SFLC2, 30% NV) was applied at a wet average deposition of 3 ml/ft² followed by a 60 minute dry period. The result was a first strength and flexibility layer having an average dry polymer film coverage of about 0.0066 g/in², which corresponded with an average layer thickness of about 0.32 mil.

Second, third, and fourth additional strength and flexibility layers were formed on over the first strength and flexibility layer, by the application of SFLC2 in the same manner as which the first strength and flexibility layer was formed. With the addition of the second, third, and fourth strength and flexibility layers, the resulting first through fourth strength and flexibility layers had a total average dry polymer film coverage of about 0.0264 g/in², which corresponded with an average total thickness of about 1.28 mil.

On top of the four strength and flexibility layers a first wear layer was formed by the application of wear layer coating composition 2 (WLC2, 23.4% NV), at a wet average deposition of 3 ml/ft², followed by an 18-24 hour dry period.

The result was a first wear layer having an average dry polymer film coverage of about 0.0051 g/in², which corresponds with an average layer thickness of about 0.25 mil. The combination of the first through fourth strength and flexibility layers, plus the first wear layer, are herein defined as Application Cycle #1.

After the 18-24 hour dry period for the first wear layer, application cycle #2 was applied in the same manner, and with the same compositions used for the application and formation of application cycle #1. The result was the addition of fifth, sixth, seventh, and eighth strength and flexibility layers, followed by the addition of a second wear layer.

After the 18-24 hour dry period for the second wear layer, application cycle #3 was applied in the same manner, and with the same compositions used for the application and formation of application cycles #1 and #2. The result was the addition of ninth, tenth, eleventh, and twelfth strength and flexibility layers, followed by the addition of a third wear layer.

After the 18-24 hour dry period for the third wear layer, application cycle #4 was applied in the same manner, and with the same compositions used for the application and formation of application cycles #1, #2, and #3. The result was the addition of thirteenth, fourteenth, fifteenth, and sixteenth strength and flexibility layers, followed by the addition of the fourth and final wear layer. The result of the above 4-cycle process was a peelable coating composed of 1 bonding layer, 16 strength and flexibility layers, and 4 wear layers.

Example 11

Example 11 was carried out identically with Example 10, except that instead of the SFLC2 utilized in Example 10, in Example 11 each of the strength and flexibility layers was formed from the application of SFLC3 (30% NV).

Example 12

Example 12 was carried out identically with Example 10, except that instead of the SFLC2 utilized in Example 10, in Example 12 each of the strength and flexibility layers was formed from the application of SFLC4 (30% NV).

Example 13

Example 13 was carried out identically with Example 10, except that instead of the SFLC2 utilized in Example 10, in Example 13 each of the strength and flexibility layers was formed from the application of SFLC5 (30% NV).

Example 14

Example 14 was carried out identically with Example 10, except that instead of the SFLC2 utilized in Example 10, in Example 14 each of the strength and flexibility layers was formed from the application of SFLC6 (30% NV).

Example 15

Example 15 was carried out identically with Example 10, except that instead of the SFLC2 utilized in Example 10, in Example 15 each of the strength and flexibility layers was formed from the application of SFLC7 (30% NV).

TABLE K

Peelable Coating Structure Examples 10-15 Lab Tile Test Peel Results

| Ex. No. | SFLC Used to Prepare Example | Average Film Thickness (mils) | 90° Peel Avg. Load (g-Force) | Average Break Force Max Load (g-Force) | Average Percent Elongation at Break (%) | Maximum Peak Load Tear Force (g-Force) |
|---|---|---|---|---|---|---|
| 10 | 2 | 4.21 | 1028 | 2289 | 468 | 488 |
| 11 | 3 | 4.40 | 504 | 5042 | 341 | 69 |
| 12 | 4 | 4.32 | 724 | 3146 | 351 | 112 |
| 13 | 5 | 4.18 | 617 | 3179 | 255 | 79 |
| 14 | 6 | 4.34 | 915 | 2454 | 251 | 245 |
| 15 | 7 | 4.29 | 583 | 2919 | 211 | 50 |

What is claimed is:

1. A peelable surface coating system comprising:
(A) a multi-section substrate with joints between sections;
(B) a multilayer peelable surface coating comprising:
(1) a plurality of strength and flexibility layers (S&FL) comprising at least one member selected from the group consisting of polyurethane, polybutadiene, polyisoprene, ethylene/propylene/diene terpolymer, polysiloxane, polyester, polyamide, polyurea, and polyether, each of the strength and flexibility layers exhibiting an average Konig hardness value of less than 40 seconds, each of the strength and flexibility layers having an average thickness of less than 0.6 mil, with the plurality of strength and flexibility layers having an average combined total post-peel thickness of from 3.3 mils to 6 mils; and
(2) a wear layer comprising at least one member selected from the group consisting of polyurethane, acrylic polymer, polysiloxane, polysilazane, polyester, polyamide, polyurea, and epoxy polymer, the wear layer exhibiting an average Konig hardness value of at least 60 seconds, the wear layer having an post-peel average thickness of from 0.2 mil to 3 mils; and
wherein the peelable surface coating system spans the joints between the sections and is peelable from both the substrate and the joints between the substrate sections, the strength and flexibility layers being between the wear layer and the substrate, with the peelable surface coating having a post-peel average percent elongation (E) of at least 350%, a post-peel average break force maximum load (BF) of at least 3000 gm-Force, and an post-peel average total thickness (T) of from 3.5 to 10 mils, and wherein:

$$(E\ \%) \times (BF\ \text{gm-Force}) \times (T\ \text{mils}) > 4 \times 10^6.$$

2. The peelable surface coating system according to claim 1, wherein:
the plurality of strength and flexibility layers comprises at least one member selected from the group consisting of polyurethane, polybutadiene, polyisoprene, polysiloxane, and polyurea, each of the strength and flexibility layers exhibiting an average Konig hardness value of from 1 to less than 40 seconds, each of the strength and flexibility layers having an average thickness of less than 0.54 mil, with the plurality of strength and flexibility layers having an average combined total post-peel thickness of from 3.5 to 5.5 mils; and
the at least one wear layer comprises at least one member selected from the group consisting of polyurethane, acrylic polymer, polysiloxane, polysilazane, polyurea, and epoxy polymer, the wear layer exhibiting an average Konig hardness value of at least 70 seconds, the wear layer having an post-peel average thickness of from 0.2 mil to 2.5 mils; and wherein the peelable surface coating having a post-peel average percent elongation (E) of at least 380%, a post-peel average break force maximum load (BF) of at least 3200 gm-Force, and an post-peel average total thickness (T) of from 3.7 to 9 mils, and wherein:

$$(E\ \%) \times (BF\ \text{gm-Force}) \times (T\ \text{mils}) \geq 4.5 \times 10^6.$$

3. The peelable surface coating system according to claim 1, wherein:

the plurality of strength and flexibility layers comprises at least one member selected from the group consisting of polyurethane made from polyester diol, polyurethane made from polycarbonate diol, polyurethane made from polyether diol, polyurethane made from polybutadiene diol, polyurethane made from polyacrylate diol, polyurethane/acrylic hybrid polymer, polybutadiene homopolymer, polyisoprene homopolymer, styrene/butadiene random copolymer, acrylonitrile/butadiene/styrene terpolymer, styrene/butadiene block copolymer, styrene/isoprene block copolymer, silicone rubber, and organically modified silicate polymer, each of the strength and flexibility layers exhibiting an average Konig hardness value of from 3 to 35 seconds, each of the strength and flexibility layers having an average thickness of less than 0.48 mil, with the plurality of strength and flexibility layers having an average combined total post-peel thickness of from 3.8 to 5 mils; and the at least one wear layer comprises at least one member selected from the group consisting of polyurethane made from polyester diol, polyurethane made from polycarbonate diol, polyurethane made from polyacrylate diol, acrylic polymer, polysilazane, uv-curable polyurethane, uv-curable polyester, uv-curable acrylic polymer, and uv-curable epoxy polymer, uv-curable polysilazane, uv-curable polysiloxane, uv-curable polyurea, polyurea made from multi-functional isocyanate and multi-functional amine, polyurethane/acrylic hybrid, polysiloxane made from multi-functional alkoxy silane, epoxy polymer made from multi-functional epoxide and multi-functional amine, and organically modified silicate polymer, the wear layer exhibiting an average Konig hardness value of at least 80 seconds, the wear layer having an post-peel average thickness of from 0.3 mil to 2 mils; and wherein the peelable surface coating having a post-peel average percent elongation (E) of at least 390%, a post-peel average break force maximum load (BF) of at least 3400 gm-Force, and an post-peel average total thickness (T) of from 4.1 to 8 mils, and wherein:

$$(E\ \%) \times (BF\ \text{gm-Force}) \times (T\ \text{mils}) \geq 4.75 \times 10^6.$$

4. The peelable surface coating system according to claim 1, wherein:

the plurality of strength and flexibility layers comprises at least one member selected from the group consisting of polyurethane made from polyester diol, polyurethane made from polycarbonate diol, polyurethane made from polyether diol, polyurethane/polyalkyl methacrylate hybrid, styrene/butadiene random copolymer, hydrogenated styrene/butadiene block copolymer, hydrogenated styrene/isoprene block copolymer, RTV silicone rubber, copolymer made from multi-functional alkoxy silanes and polydimethylsiloxane, each of the strength and flexibility layers exhibiting an average Konig hardness value of from 5 to 32 seconds, each of the strength and flexibility layers having an average thickness of less than 0.45 mil, with the plurality of strength and flexibility layers having an average combined total post-peel thickness of from 4 to 4.8 mils; and the at least one wear layer comprises at least one member selected from the group consisting of polyurethane made from polyester diol, polyurethane made from polycarbonate diol, uv-curable polyurethane/acrylic, uv-curable polyester/acrylic, uv-curable epoxy polymer/acrylic, uv-curable polysiloxane/acrylic, uv-curable polysilazane/acrylic, uv-curable polyurea/acrylic, polyurethane/polymethyl methacrylate hybrid, copolymer made from multi-functional alkoxy silane and multi-functional silazane, copolymer made from polyaspartic acid and multi-functional isocyanate polyurethane, copolymer made from multi-functional alkoxy silane and polydimethylsiloxane, polysiloxane made from multi-functional alkoxy silane, and polysilazane made from multi-functional silazane, the wear layer exhibiting an average Konig hardness value of from 90 to 250 seconds, the wear layer having an post-peel average thickness of from 0.4 mil to 2 mils; and wherein the peelable surface coating has a post-peel average percent elongation (E) of at least 400%, a post-peel average break force maximum load (BF) of at least 3700, and an post-peel average total thickness (T) of from 4.4 to 7.5 mils, and wherein:

$$(E\ \%) \times (BF\ \text{gm-Force}) \times (T\ \text{mils}) \geq 5 \times 10^6.$$

5. The peelable surface coating system according to claim 4, wherein:

the plurality of strength and flexibility layers comprises at least one member selected from the group consisting of polyurethane made from polyester diol, polyurethane/polymethyl methacrylate hybrid polymer, each of the strength and flexibility layers exhibiting an average Konig hardness value of from 10 to 30 seconds, each of the strength and flexibility layers have an average thickness of less than 0.4 mil; and wherein the at least one wear layer comprises at least one member selected from the group consisting of polyurethane made from polyester diol, polysiloxane made from multi-functional alkoxy silane, the wear layer exhibiting an average Konig hardness value of from 100 to 200 seconds; and the peelable surface coating has an post-peel average total thickness of from 5 to 7 mils, and wherein:

$$(E\ \%) \times (BF\ \text{gm-Force}) \times (T\ \text{mils}) \geq 6 \times 10^6.$$

6. The peelable surface coating system according to claim 1, wherein the multi-section substrate comprises at least one member selected from the group consisting of vinyl polymer, concrete, wood, stainless steel, aluminum, rubber, natural stone, glass, ceramic, and porcelain.

7. The peelable surface coating system according to claim 6, wherein the multi-section substrate comprises at least one member selected from the group consisting of concrete, wood, marble, granite, rubber, terrazzo, glass, quartz, ceramic, porcelain, and the plurality of strength and flexibility layers includes a first strength and flexibility layer which adheres directly to the substrate, without a bonding layer between the first strength and flexibility layer and the substrate.

8. The peelable surface coating system according to claim 1, wherein the multi-sectional substrate comprises a plurality of tiles in abutting relationship to one another at joints, with the peelable surface coating system spanning the joints between the tiles.

9. The peelable surface coating system according to claim 1, wherein the peelable surface coating system is a multi-cycle coating system further comprising:
a first cycle comprising a first set of strength and flexibility layers and a first wear layer;
a second cycle comprising a second set of strength and flexibility layers and a second wear layer; and
a third cycle comprising a third set of strength and flexibility layers and a third wear layer.

10. The peelable surface coating system according to claim 9, wherein the first set of strength and flexibility layers comprises from 2 to 7 strength and flexibility layers each having an average thickness of from 0.1 to 0.4 mil, and the second set of strength and flexibility layers comprises from 2 to 7 strength and flexibility layers each having an average thickness of from 0.1 to 0.4 mil, and the third set of strength and flexibility layers comprises from 2 to 7 strength and flexibility layers each having an average thickness of from 0.1 to 0.4 mil.

11. The peelable surface coating system according to claim 10, wherein the first set of strength and flexibility layers comprises from 2 to 5 strength and flexibility layers each having an average thickness of from 0.12 to 0.4 mil, and the second set of strength and flexibility layers comprises from 2 to 5 strength and flexibility layers each having an average thickness of from 0.12 to 0.4 mil, and the third set of strength and flexibility layers comprises from 2 to 5 strength and flexibility layers each having an average thickness of from 0.12 to 0.4 mil.

12. The peelable surface coating system according to claim 11, wherein the first set of strength and flexibility layers comprises from 3 to 5 strength and flexibility layers each having an average thickness of from 0.15 to 0.3 mil, and the second set of strength and flexibility layers comprises from 3 to 5 strength and flexibility layers each having an average thickness of from 0.15 to 0.3 mil, and the third set of strength and flexibility layers comprises from 3 to 5 strength and flexibility layers each having an average thickness of from 0.15 to 0.3 mil.

13. The peelable surface coating system according to claim 9, wherein the strength and flexibility layers of the first cycle have a total thickness of less than 1.5 mils, the strength and flexibility layers of the second cycle have a total thickness of less than 1.5 mils, and the strength and flexibility layers of the third cycle have a total thickness of less than 1.5 mils.

14. The peelable surface coating system according to claim 1, wherein the multi-section substrate comprises vinyl composition tile and the multilayer peelable surface coating comprises a bonding layer between the substrate and a first set of strength and flexibility layers, the bonding layer comprising a bonding layer polymer comprising at least one member selected from the group consisting of acrylic polymer, vinyl polymer, and styrene-butadiene polymer, the bonding layer exhibiting a Konig hardness of at least 40 seconds, the bonding layer being adhered to the substrate, the bonding layer polymer having an acid number of at least 25 mg of potassium hydroxide per dry gram of polymer.

15. The peelable coating system according to claim 14, wherein the peelable surface coating system is a multi-cycle coating system further comprising:
a first cycle comprising a first set of strength and flexibility layers and a first wear layer;
a second cycle comprising a second set of strength and flexibility layers and a second wear layer; and
a third cycle comprising a third set of strength and flexibility layers and a third wear layer.

16. The peelable coating system according to claim 14, wherein the bonding layer polymer has a weight average molecular weight of at least 25,000 and a $T_g$ of from 20° C. to 140° C., the bonding layer polymer is inorganically crosslinked with a polyvalent metal ionic crosslinker comprising zinc.

17. The peelable coating system according to claim 14, wherein the bonding layer polymer has a weight average molecular weight of less than 20,000 and a $T_g$ of at least 75° C., and an acid number of at least 100 mg of potassium hydroxide per dry gram of polymer, and the bonding layer polymer is inorganically crosslinked with a polyvalent metal ionic crosslinker comprising zinc, and the bonding layer further comprises a second bonding layer polymer having an acid number of zero and a $T_g$ of less than 40° C., the second bonding layer polymer being crosslinked with an organic crosslinker.

18. The peelable surface coating system according to claim 9, wherein the third wear layer is an outermost wear layer and comprises at least one member selected from the group consisting of polysiloxane, polysilazane, polyurea, epoxy polymer, uv-curable polyurethane, and uv-curable acrylic, and wherein the first and second wear layers do not comprise polysiloxane, polysilazane, polyurea, epoxy polymer, uv-curable polyurethane, or uv-curable acrylic.

19. The peelable surface coating system according to claim 15, wherein:
the first set of strength and flexibility layers comprises from 3 to 5 strength and flexibility layers each having an average thickness of from 0.15 to 0.3 mil,
the second set of strength and flexibility layers comprises from 3 to 5 strength and flexibility layers each having an average thickness of from 0.15 to 0.3 mil,
the third set of strength and flexibility layers comprises from 3 to 5 strength and flexibility layers each having an average thickness of from 0.15 to 0.3 mil; and
the peelable coating system further comprises a fourth cycle comprising a fourth set of strength and flexibility layers comprising from 3 to 5 strength and flexibility layers each having an average thickness of from 0.15 to 0.3 mil, together with a fourth wear layer.

20. The peelable surface coating system according to claim 19, wherein the fourth wear layer is an outermost wear layer and comprises at least one member selected from the group consisting of polysiloxane, polysilazane, polyurea, epoxy polymer, uv-curable polyurethane, and uv-curable acrylic, and wherein the first, second and third wear layers do not comprise polysiloxane, polysilazane, polyurea, epoxy polymer, uv-curable polyurethane, or uv-curable acrylic.

21. The peelable surface coating system according to claim 19, wherein the peelable coating system further comprises a fifth cycle comprising a fifth set of strength and flexibility layers comprising from 3 to 5 strength and flexibility layers each having an average thickness of from 0.15 to 0.3 mil, together with a fifth wear layer.

22. The peelable surface coating system according to claim 21, wherein the fifth wear layer is an outermost wear layer and comprises at least one member selected from the group consisting of polysiloxane, polysilazane, polyurea, epoxy polymer, uv-curable polyurethane, and uv-curable acrylic, and wherein the first, second, third and fourth wear layers do not comprise polysiloxane, polysilazane, polyurea, epoxy polymer, uv-curable polyurethane, or uv-curable acrylic.

23. A peelable surface coating system comprising:
(A) a multi-section substrate with joints between sections;
(B) a multilayer peelable surface coating comprising:
(1) a plurality of strength and flexibility layers comprising at least one strength and flexibility layer polymer selected from the group consisting of polyurethane, polybutadiene, polyisoprene, ethylene/propylene/diene terpolymer, polysiloxane, polyester, polyamide, polyurea, and polyether, the strength and flexibility layer polymer having a $T_g$ of less than 0° C., each of the strength and flexibility layers having an average thickness of less than 0.6 mil, with the plurality of strength and flexibility layers having an average combined total post-peel thickness of from 3.3 mils to 6 mils, and;
(2) a wear layer comprising at least one wear layer polymer selected from the group consisting of polyurethane, acrylic polymer, polysiloxane, polysilazane, polyester, polyamide, polyurea, and epoxy polymer, the wear layer polymer exhibiting a $T_g$ of at least 20° C., the wear layer having an average post-peel thickness of from 0.2 mil to 3 mils; and
wherein the peelable surface coating system spans the joints between the sections and is peelable from both the substrate and the joints between the substrate sections, the strength and flexibility layers being between the wear layer and the substrate, with the peelable surface coating having a post-peel average percent elongation (E) of at least 350%, a post-peel average break force maximum load (BF) of at least 3000 gm-Force, and a post-peel average total thickness (T) of from 3.5 to 10 mils, and wherein:

$(E\ \%) \times (BF\ \text{gm-Force}) \times (T\ \text{mils}) \geq 4 \times 10^6.$ 24. A process for preparing a multi-layer peelable surface coating system, comprising:
(I) depositing a waterborne strength and flexibility layer coating composition to (i) a multi-section substrate and (ii) joints between sections, the waterborne strength and flexibility layer coating composition comprising water and at least one member selected from the group consisting of polyurethane, polybutadiene, polyisoprene, ethylene/propylene/diene terpolymer, polysiloxane, polyester, polyamide, polyurea, and polyether, wherein the strength and flexibility layer coating composition is applied in a manner such that upon drying a resulting first strength and flexibility layer has an average thickness of less than 0.6 mils, the strength and flexibility layer coating composition being selected such that upon drying, the resulting first strength and flexibility layer exhibits an average Konig value of less than 40 seconds;
(II) allowing the strength and flexibility layer coating composition to dry to form the first strength and flexibility layer;
(III) repeating steps (I) and (II) at least four additional times, to form, respectively, a second strength and flexibility layer, a third strength and flexibility layer, a fourth strength and flexibility layer, and a fifth strength and flexibility layer, each of which has an average thickness of less than 0.6 mils, with the first, second, third, fourth, and fifth strength and flexibility layers together exhibiting an average combined total post-peel thickness of from 3.3 mils to 6 mils;
(IV) depositing a wear layer coating composition over the fifth strength and flexibility layer, the wear layer coating composition comprising at least one member selected from the group consisting of polyurethane, acrylic polymer, polysiloxane, polysilazane, polyester, polyamide, polyurea, and epoxy polymer, the wear layer coating composition being selected such that upon curing, the resulting wear layer exhibits a Konig hardness value of at least 60 seconds; and
(V) allowing the wear layer coating composition to dry and/or cure to form the wear layer having a post-peel average thickness of from 0.2 mil to 3 mils, and to form the peelable surface coating system;
wherein the strength and flexibility layer coating composition and the wear layer coating composition are applied to the multi-section substrate in a manner such that the peelable surface coating spans the joints between the substrate sections and is peelable from the substrate as well as from the joints between the substrate sections, with the peelable surface coating having a post-peel average percent elongation (E) of at least 350%, a post-peel average break force maximum load (BF) of at least 3000 gm-Force, and a post-peel average total thickness (T) of from 3.5 to 10 mils, and wherein:

$(E\ \%) \times (BF\ \text{gm-Force}) \times (T\ \text{mils}) \geq 4 \times 10^6.$ 25. The process according to claim 24, wherein the peelable coating system is applied as a multi-cycle coating system with each cycle comprising a plurality of the strength and flexibility layers and a wear layer.

26. The process according to claim 24, wherein the wear layer coating composition is a waterborne coating composition comprising water.

27. A process for providing a multi-section substrate surface with a coating, and maintaining the multi-section substrate surface, comprising:
(I) providing a stripped multi-section substrate surface having joints between the sections of the substrate surface;
(II) depositing a waterborne strength and flexibility layer coating composition to (i) the surface of multi-section substrate and (ii) the joints between sections, the strength and flexibility layer coating composition comprising at least one member selected from the group consisting of polyurethane, polybutadiene, polyisoprene, ethylene/propylene/diene terpolymer, polysiloxane, polyester, polyamide, polyurea, and polyether, wherein the strength and flexibility layer coating composition is applied in a manner such that upon drying a resulting first strength and flexibility layer has an average thickness of less than 0.6 mils, the strength and flexibility layer coating composition being selected such that upon drying, the resulting first strength and flexibility layer exhibits an average Konig value of less than 40 seconds;
(III) allowing the strength and flexibility layer coating composition to dry to form the first strength and flexibility layer;
(IV) repeating steps (II) and (III) at least four additional times, to form, respectively, a second strength and flexibility layer, a third strength and flexibility layer, a fourth strength and flexibility layer, and a fifth strength and flexibility layer, each of which has an average thickness of less than 0.6 mils, with the first, second, third, fourth, and fifth strength and flexibility layers together exhibiting a post-peel average total thickness of from 3.3 mils to 6 mils;

(V) depositing a wear layer coating composition over the fifth strength and flexibility layer, the wear layer coating composition comprising at least one member selected from the group consisting of polyurethane, acrylic polymer, polysiloxane, polysilazane, polyester, polyamide, polyurea, and epoxy polymer, the wear layer coating composition being selected such that upon drying, the resulting wear layer exhibits a Konig hardness value of at least 60 seconds, and so that the wear layer has a post-peel average thickness of from 0.2 to 0.3 mils; and (VI) allowing the wear layer coating composition to dry and/or cure to form the wear layer and the peelable surface coating system;

(VII) allowing the peelable surface coating system to be subjected to use;

(VIII) peeling the peelable coating system from the multi-section substrate and from the joints between the sections of the multi-section substrate; and (IX) repeating steps (II) through (VI); and wherein the strength and flexibility layer coating composition and the wear layer coating composition are applied to the multi-section substrate in a manner such that the peelable surface coating spans the joints between the sections and is peelable from the surface of the substrate as well as from the joints between the sections, with the peelable surface coating having a post-peel average percent elongation (E) of at least 350%, a post-peel average break force maximum load (BF) of at least 3000 gm-Force, and an average post-peel average total thickness (T) of from 3.5 to 10 mils, and wherein:

$$(E\,\%) \times (BF\,\text{gm-Force}) \times (T\,\text{mils}) \geq 4 \times 10^6.$$

28. The process according to claim 27, wherein the multi-sectional substrate comprises 12-inch by 12-inch vinyl composition tiles and the peelable coating system exhibits a peel level of 100 percent from a perimeter-cut 30 square foot area 5 tiles wide and by 6 tiles long.

* * * * *